(12) United States Patent
Stapp

(10) Patent No.: US 12,006,867 B2
(45) Date of Patent: Jun. 11, 2024

(54) ACOUSTIC SYSTEM FOR DETERMINING THE TEMPERATURE OF A SUPERCRITICAL FLUID IN A CONDUIT

(71) Applicant: PEREGRINE TURBINE TECHNOLOGIES, LLC, Wiscasset, ME (US)

(72) Inventor: David S. Stapp, Bremen, ME (US)

(73) Assignee: Peregrine Turbine Technologies, LLC, Wiscasset, ME (US)

( * ) Notice: Subject to any disclaimer, the term of this patent is extended or adjusted under 35 U.S.C. 154(b) by 0 days.

(21) Appl. No.: 18/112,299

(22) Filed: Feb. 21, 2023

(65) Prior Publication Data

US 2023/0203988 A1 Jun. 29, 2023

Related U.S. Application Data

(62) Division of application No. 16/126,216, filed on Sep. 10, 2018, now abandoned, which is a division of application No. 15/385,745, filed on Dec. 20, 2016, now Pat. No. 10,072,574, which is a division of application No. 13/679,856, filed on Nov. 16, 2012, now Pat. No. 9,540,999.

(60) Provisional application No. 61/741,303, filed on Jul. 17, 2012, provisional application No. 61/688,310, filed on May 11, 2012, provisional application No. 61/686,043, filed on Mar. 29, 2012, provisional application No. 61/632,030, filed on Jan. 17, 2012.

(51) Int. Cl.
*F02C 6/18* (2006.01)
*F02C 1/10* (2006.01)
*F02C 3/04* (2006.01)

(52) U.S. Cl.
CPC ............ *F02C 6/18* (2013.01); *F02C 1/10* (2013.01); *F02C 3/04* (2013.01); *F05D 2220/32* (2013.01); *F05D 2220/70* (2013.01); *Y02E 20/14* (2013.01)

(58) Field of Classification Search
CPC ...... F02C 6/18; F02C 1/10; F02C 3/04; F05D 2220/32; F05D 2220/70; Y02E 20/14; G01K 11/24; G01N 29/024
USPC .............................................. 60/772; 73/597
See application file for complete search history.

(56) References Cited

U.S. PATENT DOCUMENTS

| | | | | |
|---|---|---|---|---|
| 7,731,420 B2* | 6/2010 | Brummel | ............... | G01K 11/22 374/119 |
| 10,920,667 B2* | 2/2021 | Apte | ........................ | F02C 1/04 |
| 2006/0079815 A1* | 4/2006 | Sato | ........................ | G01F 1/663 601/2 |
| 2007/0125063 A1* | 6/2007 | Evulat | ...................... | F02C 6/10 60/39.15 |
| 2007/0201603 A1* | 8/2007 | Sato | ........................ | G21D 3/08 376/298 |

(Continued)

FOREIGN PATENT DOCUMENTS

| | | | | | |
|---|---|---|---|---|---|
| CN | 114544461 A | * | 5/2022 | ......... | G01N 15/0826 |
| JP | 2001074567 A | * | 3/2001 | | |
| WO | WO-2012176256 A1 | * | 12/2012 | ............... | F02C 1/10 |

OTHER PUBLICATIONS

Translation WO-2012176256 (Year: 2012).*
Translation JP-2001074567 (Year: 2001).*

*Primary Examiner* — Peter J Macchiarolo
*Assistant Examiner* — Monica S Young
(74) *Attorney, Agent, or Firm* — BakerHostetler

(57) ABSTRACT

A system for determining the temperature of a supercritical fluid that involves determining the speed of sound in the supercritical fluid.

7 Claims, 19 Drawing Sheets

(56) References Cited

U.S. PATENT DOCUMENTS

| | | | |
|---|---|---|---|
| 2008/0208483 A1* | 8/2008 | Loose | G01N 29/024 |
| | | | 702/22 |
| 2011/0179799 A1* | 7/2011 | Allam | F02C 3/20 |
| | | | 110/297 |
| 2012/0055239 A1* | 3/2012 | Sinha | G01F 25/10 |
| | | | 73/61.79 |
| 2012/0128463 A1* | 5/2012 | Held | F01K 23/10 |
| | | | 165/185 |
| 2015/0167554 A1* | 6/2015 | Cho | F02C 6/18 |
| | | | 60/806 |

* cited by examiner

ACOUSTIC SYSTEM FOR DETERMINING THE TEMPERATURE OF A SUPERCRITICAL FLUID IN A CONDUIT

RELATED APPLICATIONS

This application is a divisional application of U.S. patent application Ser. No. 16/126,216 filed Sep. 10, 2018, which is a divisional of U.S. patent application Ser. No. 15/385,745 filed Dec. 20, 2016, now U.S. Pat. No. 10,072,574 issued Sep. 11, 2018, which is a divisional of U.S. patent application Ser. No. 13/679,856, filed Nov. 16, 2012, now U.S. Pat. No. 9,540,999 issued Jan. 10, 2017, entitled System And Method For Generating Power Using A Supercritical Fluid, that claims benefit and priority to U.S. Provisional Application Ser. No. 61/632,030, filed Jan. 17, 2012; U.S. Provisional Application Ser. No. 61/686,043, filed Mar. 29, 2012; U.S. Provisional Application Ser. No. 61/688,310, filed May 11, 2012; and U.S. Provisional Application Ser. No. 61/741,303, filed Jul. 17, 2012, the disclosure of each of which is hereby incorporated by reference in its entirety.

TECHNICAL FIELD

The present disclosure relates to a method, apparatus, and system for determining the temperature of a supercritical fluid that involves determining the speed of sound in the supercritical fluid.

BACKGROUND

Traditionally, thermodynamic power generation cycles, such as the Brayton cycle, employ an ideal gas, such as atmospheric air. Such cycles are open in the sense that after the air flows through the components of the cycle, it is exhausted back to atmosphere at a relatively high temperature so that a considerable amount heat generated by the combustion of fuel is lost from the cycle. A common approach to capturing and utilizing waste heat in a Brayton cycle is to use a recuperator to extract heat from the turbine exhaust gas and transfer it, via a heat exchanger, to the air discharging from the compressor. Since such heat transfer raises the temperature of the air entering the combustor, less fuel is required to achieve the desired turbine inlet temperature. The result is improved thermal efficiencies for the overall thermodynamic cycle and generally results in efficiencies as high as about 40%. Larger turbines with more advanced blade aerodynamic design may achieve even greater efficiencies. However, even in such recuperated cycles, the thermal efficiency is limited by the fact that the turbine exhaust gas temperature can never be cooled below that of the compressor discharge air, since heat can only flow from a high temperature source to a low temperature sink. This is exacerbated by the fact that employing higher pressure ratios, which improves the efficiency of the turbine overall, results in higher compressor discharge temperature and, therefore, less heat recovery in the recuperator.

More recently, interest has arisen concerning the use of supercritical fluids, such as supercritical carbon dioxide, in closed thermodynamic power generation cycles. Advantageously, supercritical fluids—that is, a fluid at or above the "critical point" at which the liquid and gaseous phases are in equilibrium—have a density and compressibility approaching that of a liquid so that the work required to compress the fluid to the desired pressure ratio is much lower than it would be for an ideal gas, such as air.

Unfortunately, supercritical fluid cycles suffer from several disadvantages that have limited their use. First, although supercritical fluid cycles are generally closed in the sense that the supercritical fluid is returned to the cycle inlet after generating power, all of the heat necessary to return the supercritical fluid to near its critical point prior to reintroduction into the compressor cannot be efficiently converted to power, so that the supercritical fluid must be cooled by the transfer of heat to an external heat sink, prior to its reintroduction into the compressor. This cooling results in the loss of heat from the cycle and a degradation in thermal efficiency.

Second, unlike what is typically done in air-based open cycles, fossil fuel cannot be combusted in a supercritical fluid without the addition of an oxidizer and subsequent removal of the by-products of combustion from the closed cycle. Consequently, supercritical fluids have most often been proposed for use in conjunction with nuclear power plants in which the nuclear reaction provides the source of heat. Although it is possible to heat the supercritical fluid in a heat exchanger supplied with combustion gas from a conventional fossil fuel fired gas turbine, because of the inefficiency discussed above associated with the high recuperated compressor discharge temperature and the limited ability to transfer heat into the cycle from the combustion products, the use of relatively expensive fossil fuel to heat the supercritical fluid makes the use of such fuels impractical.

Third, the high pressure of the supercritical fluid, e.g., over 7.0 MPa, creates difficulties in sealing the shafting that transmits the torque developed by the supercritical fluid turbine. If the supercritical fluid cycle is used to generate electrical power, one approach is to include the electrical generator in the pressure vessel along with the turbine so that the power shaft need not penetrate the pressure vessel. However, this approach has a number of drawbacks. For example, it results in high windage losses in the generator and requires oil-less bearings. Moreover, maintenance and servicing of the electrical generator becomes more difficult. Additionally, large generators would require large pressure vessels for containment, resulting in substantial costs and creating additional points of failure. Also, such an approach cannot be used in applications in which the goal is not the production of electrical power, such as in any kind of vehicle propulsion (i.e. turboprop/turbofan applications, automotive and long haul truck drives, marine propulsion) and other applications like oil and gas industry applications including gas line booster compressors.

Fourth, the efficiency of a supercritical fluid cycle is greatly affected by slight deviations in the temperature of the supercritical fluid in the vicinity of the critical temperature. However, it is difficult to measure the temperature of the fluid with the requisite accuracy to ensure operation at maximum efficiency.

Finally, prior art supercritical carbon dioxide Brayton cycles typically make use of recuperation as described above; the reason being that turbine exhaust temperatures in SCO2 cycles are still very elevated and compressor discharge temperatures very low making for an ideal recipe for recuperation. This is another reason that SCO2 Brayton cycles are so efficient in nuclear and solar applications. Unfortunately, if a fossil fuel were used as the heat source, passing recuperated compressor discharge through a heat exchanger would make it difficult to pass heat into the SCO2 flow because the incoming temperature is already so high.

Therefore, the need exists for a system and method for efficiently using a supercritical fluid in a thermodynamic cycle operating on a fossil fuel and generating shaft power and/or hot water. The need also exists for an apparatus and method for effectively transmitting torque from the shaft of a supercritical fluid turbine. Further, the need exists for an accurate method of measuring the temperature of the supercritical fluid in the vicinity of the critical point.

SUMMARY

The present invention encompasses a method of generating shaft power in a system comprising an air cycle and supercritical fluid cycle. The method includes the steps of (a) burning a fossil fuel in air so as to produce a combustion gas, (b) expanding the combustion gas in at least a first turbine so as to produce an expanded combustion gas, with the expansion of the combustion gas generating shaft power, (c) compressing a supercritical fluid in a first compressor, (d) flowing at least a portion of the compressed supercritical fluid and the combustion gas through the first cross cycle heat exchanger so as to transfer heat from the combustion gas to the compressed supercritical fluid so as to produce a heated compressed supercritical fluid, (e) expanding at least a portion of the heated compressed supercritical fluid in a second turbine so as to produce an expanded supercritical fluid, with the expansion of the supercritical fluid generating additional shaft power, and (f) flowing at least a portion of the expanded supercritical fluid and the air through the second cross cycle heat exchanger prior to burning the fossil fuel in the air so as to transfer heat from the expanded supercritical fluid to the air. According to one embodiment of the invention, the method further comprises compressing the air in a second compressor so as to produce compressed air prior to burning the fossil fuel in the air so that the fossil fuel is burned in the compressed air and in which the compressed air flows through the second cross cycle heat exchanger so as to transfer heat from the expanded supercritical fluid to the compressed air.

The invention also encompasses a method for generating shaft power in a system comprising a supercritical fluid cycle and an air cycle that comprises the steps of (a) burning a fossil fuel in air so as to produce a combustion gas, (b) compressing a supercritical fluid in a first compressor, (c) transferring heat from the combustion gas to the compressed supercritical fluid so as to produce a cooled combustion gas and a heated compressed supercritical fluid, (d) expanding at least a portion of the heated compressed supercritical fluid in a first turbine so as to produce an expanded supercritical fluid, with the expansion of the supercritical fluid generating shaft power, (e) returning the expanded supercritical fluid to the first compressor, and (f) transferring heat from the expanded supercritical fluid to the air so as to cool the supercritical fluid to approximately its critical temperature prior to burning the fossil fuel in the air and prior to returning the supercritical fluid to the first compressor. In one embodiment of the invention, the method further comprises transferring heat from the cooled combustion gas to a flow of water so as to produce a flow of heated water.

The invention also encompasses a method for generating shaft power in a system comprising two supercritical fluid cycles and an air cycle that comprises the steps of (a) burning a fossil fuel in air so as to produce a combustion gas, (b) compressing a first flow of supercritical fluid in a first compressor so as to produce a first flow of compressed supercritical fluid, (c) transferring heat from the combustion gas to the first flow of the compressed supercritical fluid so as to produce a cooled combustion gas and a first flow of heated compressed supercritical fluid, (d) expanding at least a portion of the first flow of heated compressed supercritical fluid in a first turbine so as to produce a first flow of expanded supercritical fluid, with the expansion of the first flow of supercritical fluid generating shaft power, (e) returning the first flow of expanded supercritical fluid to the first compressor, (f) transferring heat from the first flow of expanded supercritical fluid to the air prior to returning the first flow of supercritical fluid to the first compressor, (g) compressing a second flow of supercritical fluid in a second compressor so as to produce a second flow of compressed supercritical fluid, (h) transferring heat from the cooled combustion gas to the second flow of compressed supercritical fluid so as to produce a second flow of heated compressed supercritical fluid, (i) expanding the second flow of heated compressed supercritical fluid in a second turbine so as to produce a second flow of expanded supercritical fluid and so as to generate additional shaft power.

The invention also encompasses a system for generating shaft power using a supercritical fluid cycle and an air cycle that comprises first and second flow paths. The first flow path directs the flow of a first fluid, which comprises air, and comprises (i) a combustor connected to the first flow path so as to receive at least a portion of the air, the combustor supplied with a fossil fuel for combustion in the air, and in which the combustion of the fossil fuel in the air produces heated combustion gas, and (ii) a first turbine connected to the first flow path. The second flow path directs the flow of a second fluid, which comprises a supercritical fluid, and that is separate from the first flow path so as to prevent mixing of the air and the supercritical fluids. The second flow path comprises (i) a first compressor connected to the second flow path so as to receive the supercritical fluid for compression therein and to discharge the compressed supercritical fluid into the second flow path, and (ii) a second turbine for expansion of the supercritical fluid, with the second turbine connected to the second flow path so as to discharge the expanded supercritical fluid into the second flow path. The system also comprises a first cross cycle heat exchanger connected to the first and second flow paths so as to (i) receive at least a portion of the air for transfer of heat thereto so as to heat the portion of the air prior to the portion of the air being received by the combustor, and (ii) discharge the heated air into the first flow path, with the first cross cycle heat exchanger being connected to the second flow path so as to receive at least a portion of the expanded supercritical fluid discharged from the second turbine for transfer of heat therefrom so as to cool at least the portion of the expanded supercritical fluid, and to discharge the cooled expanded supercritical fluid into the second flow path, with the expanded supercritical fluid transferring heat to the air. The system also includes a second cross cycle heat exchanger connected to the first and second flow paths so as to receive at least a portion of the combustion gas produced by the combustor for transfer of heat therefrom so as to cool the combustion gas, and discharge the cooled combustion gas into the first flow path, and so as to receive at least a portion of the compressed supercritical fluid from the first compressor for the transfer of heat thereto so as to heat at least the portion of the compressed supercritical fluid and discharge the heated supercritical fluid into the second flow path, with the combustion gas transferring heat to the compressed supercritical fluid. In the system, the first turbine is connected to the first flow path so as to receive at least a portion of the combustion gas produced by the combustor for expansion therein, and to discharge the expanded combustion gas to the first flow path, while the second turbine is connected to the second flow path so as to receive the heated supercritical fluid discharged from the second cross cycle heat exchanger, the second turbine having a second shaft, with the expansion of the compressed supercritical fluid in the second turbine driving rotation of the second shaft.

The invention also encompasses a system for generating shaft power using a supercritical fluid cycle and an air cycle that comprises (a) a combustor for burning a fossil fuel in air so as to produce a combustion gas, (b) a first compressor for compressing a supercritical fluid so as to produce a compressed supercritical fluid, (c) a first cross cycle heat exchanger for transferring heat from the combustion gas to the compressed supercritical fluid so as to produce a cooled combustion gas and a heated compressed supercritical fluid, (d) a first turbine for expanding at least a portion of the heated compressed supercritical fluid so as to produce an expanded supercritical fluid, with the expansion of the supercritical fluid generating shaft power, (e) a flow path for returning the expanded supercritical fluid to the first compressor, (f) a second cross cycle heat exchanger for transferring heat from the expanded supercritical fluid to the air so as to cool the supercritical fluid to approximately its critical temperature prior to burning the fossil fuel in the air in the combustor and prior to returning the supercritical fluid to the first compressor.

The invention also encompasses a system for generating shaft power using a supercritical fluid cycle and an air cycle that comprises (a) a combustor for burning a fossil fuel in air so as to produce a combustion gas, (b) a first compressor for compressing a first flow of supercritical fluid so as to produce a first flow of compressed supercritical fluid, (c) a first heat exchanger for transferring heat from the combustion gas to the first flow of the compressed supercritical fluid so as to produce a cooled combustion gas and a first flow of heated compressed supercritical fluid, (d) a first turbine for expanding at least a portion of the first flow of heated compressed supercritical fluid so as to produce a first flow of expanded supercritical fluid, the expansion of the first flow of supercritical fluid generating shaft power, (e) a flow path for returning the first flow of expanded supercritical fluid to the first compressor, (f) a second heat exchanger for transferring heat from the first flow of expanded supercritical fluid to the air prior to returning the first flow of supercritical fluid to the first compressor, (g) a second compressor for compressing a second flow of supercritical fluid so as to produce a second flow of compressed supercritical fluid, (h) a third heat exchanger for transferring heat from the cooled combustion gas to the second flow of compressed supercritical fluid so as to produce a second flow of heated compressed supercritical fluid, (i) a second turbine for expanding the second flow of heated compressed supercritical fluid so as to produce a second flow of expanded supercritical fluid and so as to generate additional shaft power.

The invention also encompasses a coupling from transmitting torque from a turbine shaft to a drive shaft in a system for generating shaft power by expanding a supercritical fluid in the turbine. The coupling comprising (a) an induction rotor adapted to be connected to the turbine shaft so as to rotate with the turbine shaft, (b) first and second armatures adapted to be connected to the drive shaft so as to rotate with the drive shaft, (c) a magnet creating a magnetic flux within the coupling, the magnet connected to the first and second armnatures so as to rotate with the armatures, whereby rotation of the induction rotor imparts torque to the first and second armatures that causes rotation of the drive shaft, (d) a first flow path for directing a portion of the supercritical fluid to the induction rotor for cooling the induction rotor, whereby the portion of the supercritical fluid is heated, and (e) a second flow path for directing the heated supercritical fluid to the turbine for expansion therein. In one embodiment of the invention, the coupling further comprises a pressure membrane disposed between the induction rotor and the first and second armatures, with the pressure membrane having an approximately spherically shaped surface.

DETAILED DESCRIPTION OF ILLUSTRATIVE EMBODIMENTS

Figure 1:
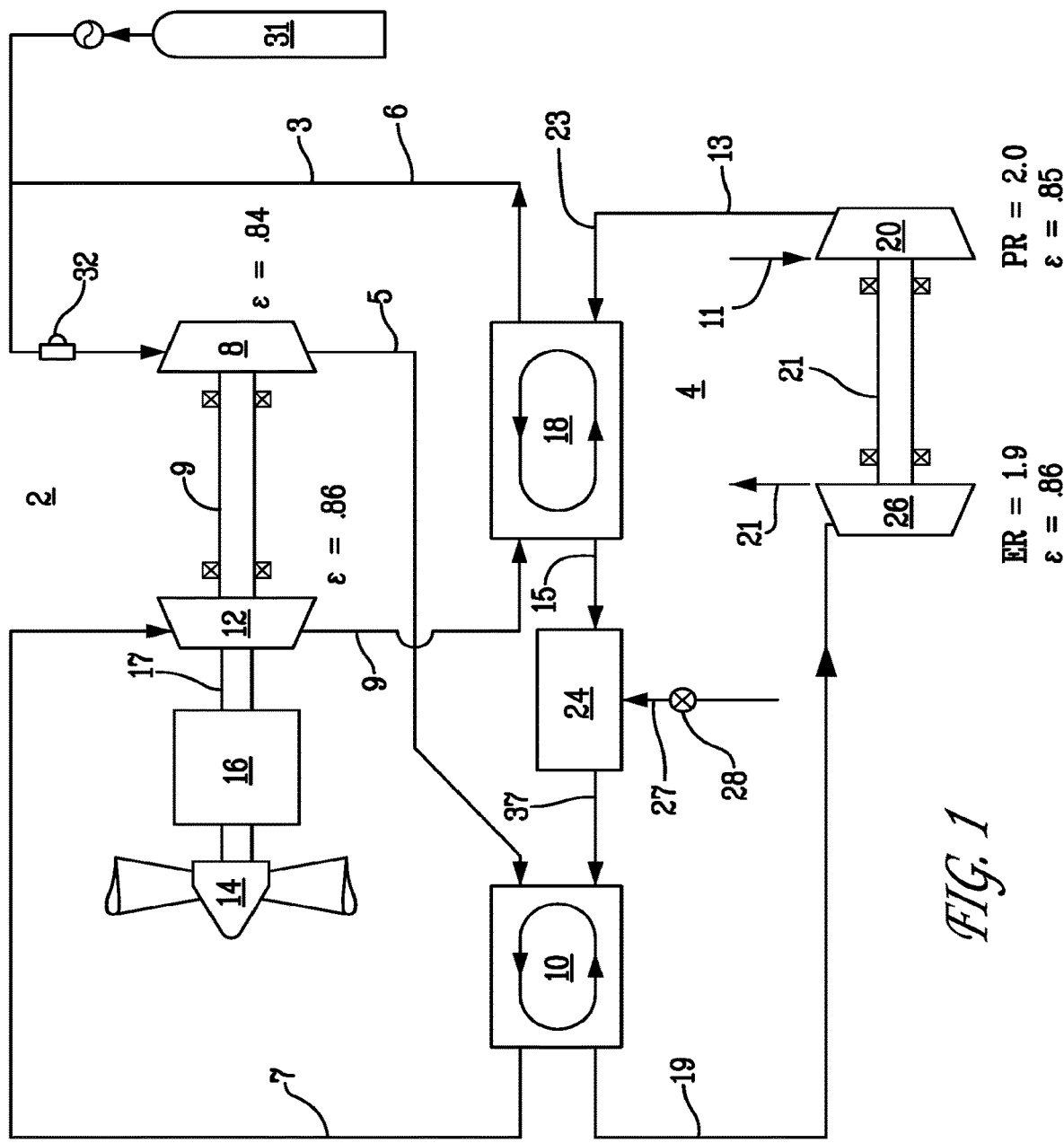
FIG. 1 is a schematic diagram of one embodiment of a power generation system according to the current invention in which the shaft power drives a turboprop.

One embodiment of a fossil fuel fired, dual cycle, supercritical fluid-air system for generating shaft power according to the current invention is shown in FIG. 1. The system comprises a first Brayton cycle system 2, in which the working fluid is a supercritical fluid, such as supercritical carbon dioxide (SCO2), and a second Brayton cycle system 4 in which the working fluid is ambient air. Each of these cycles comprises a flow path 6 and 23, which may be formed by piping, ductwork or other conduits as appropriate, to which various components, such as compressors, turbines, combustors and heat exchangers, are connected. The SCO2 cycle flow path 6 and air breathing cycle flow path 23 are preferably separate so that little or no mixing occurs between the fluids in the two flow paths.

Figure 2:
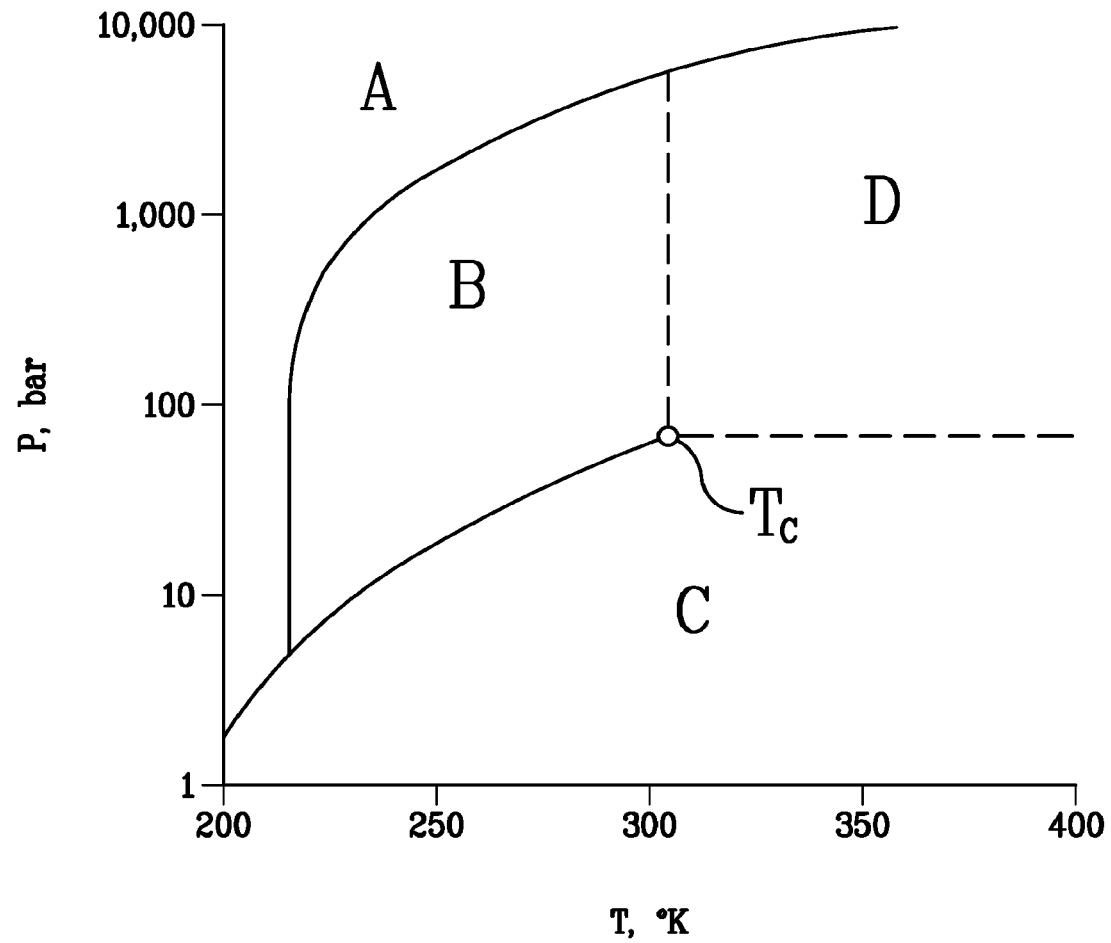
FIG. 2 is a pressure-temperature phase diagram for supercritical carbon dioxide in which the X-axis is temperature T and the y-axis is the log of pressure P.

The supercritical Brayton cycle system 2 forms a closed cycle flow path 6 through which the supercritical fluid flows. Initially, a stream 3 of supercritical fluid is supplied to the inlet of a compressor 8, which may be an axial, radial or even reciprocating type. A flow meter 32 measures the flow rate of the fluid supplied to the compressor inlet. This provides a means for inventory control of total SCO2 mass in the closed system as well as for control of transient flow behavior. Preferably, the supercritical fluid enters the inlet of the compressor 8 after it has been cooled and expanded, as discussed below, to a temperature and pressure that is close to its critical point. This critical point is illustrated in FIG. 2, which is a pressure-temperature phase diagram for a supercritical fluid, in this case, carbon dioxide. The carbon dioxide is a solid in region A, a liquid in region B and a gas in region C. In the region D above the temperature and pressure at the critical point E, the carbon dioxide exists as a supercritical fluid. Thus, as used herein, the term "supercritical fluid" refers to a fluid in which distinct liquid and gaseous phases do not exist, and term "critical point" of a supercritical fluid refers to the lowest temperature and pressure at which the substance can be said to be in a supercritical state. The terms "critical temperature" and "critical pressure" refer to the temperature and pressure at the critical point. For carbon dioxide, the critical point is approximately 304.2° K and 7.35 MPa. Preferably, the supercritical fluid entering the compressor 8 is cooled to within at least ±2° K of its critical point, more preferably to within ±1° K of its critical point, and most preferably to within ±0.2° K of its critical point.

After compression in the compressor 8, the stream 5 of SCO2 is heated in a cross cycle heat exchanger 10, which may be a Printed Circuit Heat Exchanger (PCHE) or other type as appropriate and which is connected to the flow paths 6 and 23 of both the SCO2 and air breathing cycles. As used herein, the term "cross cycle heat exchanger" refers to a heat exchanger that receives both air or combustion gas from the air breathing cycle as well as a supercritical fluid from the supercritical fluid cycle and transfers heat between the fluids in the two cycles. The stream 7 of heated SCO2 from the heat exchanger 10 is then directed to the inlet of a turbine 12, which may be an axial, radial or mixed flow type, in which the SCO2 is expanded and produces shaft power that drives both the SCO2 compressor 8, via shaft 9, and a turboprop 14, via a shaft 17 and a reduction gear 16. After expansion in the turbine 12, the stream 9 of SCO2 is cooled in a second cross cycle heat exchanger 18, which may be a PCHE type and which is connected to the flow paths 6 and 23 of both the SCO2 and air breathing cycles. The stream 3 of cooled SCO2 is returned to the inlet of the compressor 8 via the flow path 6. Preferably the cross cycle heat exchanger 18 has sufficient surface area to cool the SCO2 returned to the compressor 8 to a temperature close to its critical temperature as discussed above. Additional SCO2 from a supply 31 can be introduced into the stream 3 of SCO2 directed to the compressor 8 to make up for any leakage of SCO2 from the system. In addition, the introduction of additional SCO2 into the system can be modulated to attenuate system dynamics during transients. In any event, the SCO2 3 is returned to the inlet of the compressor 8 and the steps of compressing-heating-expanding-cooling are repeated.

A shown in FIG. 1, the air breathing Brayton system 4 portion of the overall system forms an open flow path 23. Initially, ambient air 11 is supplied to a compressor 20 which may be axial, radial or reciprocating type. The stream 13 of compressed air from the compressor 20 is then heated in the heat exchanger 18 by the transfer of heat from the SCO2 after the SCO2 has been expanded in the turbine 12. The stream 15 of heated compressed air is then directed to a combustor 24 into which a fossil fuel 27, such as jet fuel, diesel fuel, natural gas or bio-fuel, is introduced by a fuel controller 28 and combusted in the air so as to produce hot combustion gas. The stream 37 of the combustion gas from the combustor 24 is directed to the heat exchanger 10 where heat is transferred to the SCO2, as discussed above. After exiting the heat exchanger 10, the stream 19 of combustion gas is expanded in a turbine 26 which may be an axial, radial or mixed flow type, and which produces power to drive the air compressor 20, via shaft 21. After expansion in the turbine 26, the combustion gas 47 is exhausted to atmosphere.

The operation of the system shown in FIG. 1 will now be illustrated by way of an example of predicted results. In this example which is for a turboprop/turbofan application, the ambient air, which is at standard day conditions at 9000 m, is supplied to the inlet of the compressor 20 at 229.7° K and 32 KPa. The air compressor 20 is operated at a compression ratio of only about 2.0 so that the compressed air discharged by the compressor and directed to the heat exchanger 18 is at a temperature and pressure of only about 295° K and 65 KPa. The SCO2 exhausted from the turbine 12 and directed to the heat exchanger 18 is at a temperature and pressure of about 935° K and 7.5 Mpa. The heat exchanger 18 has sufficient heat transfer surface area so that the compressed air is heated from about 295° K to about 923° K and the SCO2 is cooled from about 935° K to about 305° K, close to its critical temperature. In order to control the temperature of the SCO2 entering the compressor 8, so as to maintain it close to its critical temperature, the compressed air discharged by the compressor 20 can be directed to a heat exchanger (not shown) supplied with a cooling fluid. The flow rate and/or temperature of the cooling fluid can be varied so as to adjust the temperature of the compressed air entering the heat exchanger 18 so that the heat transfer in heat exchanger 18 cools the SCO2 to a temperature close to its critical temperature.

In this example, sufficient fuel is burned in the combustor 24 to heat the compressed air discharged from the heat exchanger 18 from about 886° K to about 1121° K, the temperature at which it enters the heat exchanger 10. The SCO2 compressor 8 operates at a much higher compression ratio than the air breathing compressor 20, and compresses the SCO2 from its incoming pressure of 7.4 Mpa, close to the critical pressure, to a pressure of approximately 25.9 MPa and a temperature of approximately 383° K, the temperature and pressure at which the SCO2 is supplied to the heat exchanger 10. Heat exchanger 10 contains sufficient heat transfer surface area so that the SCO2 is heated from about 383° K to about 1103° K and the combustion gases are cooled from about 1121° K to about 399° K. After the combustion gas is expanded in the turbine 26, it is exhausted to atmosphere at about 341° K. After the heated SCO2 is expanded in the turbine 12, it is exhausted at about 935° K to heat exchanger 18, where it is cooled to about 305° K prior to return to the inlet of the SCO2 compressor 8, as discussed above.

The system illustrated in FIG. 1 has several important advantages. Supercritical fluids such as SCO2 have a very low dynamic viscosity and high specific heat, which facilitates the use of heat exchangers that have a low pressure drop and high effectiveness for a given size and weight. Further, since a supercritical fluid, such as SCO2, has a density and compressibility approaching that of a liquid, the work required to compress the fluid to the desired pressure ratio is much lower than it would be for an ideal gas such as air. This not only increases the net work available from the SCO2 turbine 12, it results in lower compressor discharge temperature from the SCO2 compressor which, in turn, increases the heat transfer from the combustion gas to the SCO2 discharged by the compressor 8 that is achieved in the heat exchanger 10.

Moreover, the air compressor 20 is operated at a relatively low pressure ratio so that the air discharging from the air compressor is at a relatively low temperature (295° K in the example above), thereby increasing the heat that can be recovered from the SCO2 in the heat exchanger 18. As a result of the high heat transfer in heat exchanger 18, it may be unnecessary to employ any "external" cooler to cool the SCO2 exhausted from the turbine 12 to the appropriate temperature—preferably close to its critical temperature—for return to the inlet of the compressor 8. Thus, the cycle rejection heat that would otherwise be lost from the cycle to an external heat sink, such as cooling water from a cooling tower, in order to cool the SCO2 following expansion in the turbine 12 is retained within the system.

Assuming an efficiency of 87% for the turbines 12 and 26 and efficiencies of 85% and 87%, respectively, for the SCO2 compressor 8 and the air compressor 20, the overall cycle efficiency of the system shown in FIG. 1, and operated as discussed above, is calculated to be about 54%.

Although it is not necessary to incorporate all of the following characteristics in order to achieve the benefits of the current invention, the characteristics of the system shown in FIG. 1 that contribute to high thermal efficiency are the use of (i) two Brayton cycles operating in parallel, one of which (system 2) operates on a supercritical fluid, preferably SCO2, and the other of which (system 4) operates on ambient air, which acts similarly to an ideal gas, (ii) a first cross cycle heat exchanger (heat exchanger 18) in which cycle rejection heat which is normally lost in cooling the SCO2 to the desired compressor inlet temperature (preferably close to its critical temperature) is instead transferred from the SCO2 exhausted from the turbine 12 in the SCO2 cycle to the air discharging from the compressor 20 in the air breathing cycle, (iii) a second cross cycle heat exchange (heat exchanger 10) in which heat is transferred from the combustion gas of the air breathing cycle to the compressor discharge in the SCO2 cycle, and (iv) a relatively low pressure ratio in the air breathing compressor 20, which would be considered suboptimal according to convention thinking but which, in the current invention, allows the return of a large amount of heat to the system in cooling the SCO2 exhausted from the turbine to the desired compressor inlet temperature.

Although the system discussed above has been illustrated as supplying shaft power for a turboprop, it should be understood that the invention is also applicable to any other application utilizing shaft power, including but not limited to electrical power generation, naval propulsion systems, rail engine drives, hybrid drives for automobiles and trucks, gas booster pumps for the oil and gas industry, agricultural pumping applications, and construction equipment drives.

Although optimal benefits are obtained according to the current invention by using both a supercritical Brayton cycle system and an air breathing Brayton cycle system in tandem, certain benefits can nevertheless be achieved by operating both systems illustrated in FIG. 1 on ambient air. Such an embodiment provides the ability to use a variety of fuels, including low quality fossil fuels, biomass and even solar power. In such a system, the products of combustion, including ash, would not pass through the higher temperature turbine 12 and therefore cause no fouling of turbine air cooled components. Ash and combustion byproducts would pass through the low expansion turbine 26 at a much lower temperature such that cooling passages are unnecessary and making a particulate resistant turbine fairly straightforward. Particulate build-up in the downstream heat exchanger 10 could be dealt with through periodic wash or cleaning cycles, which could be done during routine shutdowns.

Although the embodiment in FIG. 1 has been depicted as directing the combustion gas 37 from the combustor 24 to the heat exchanger 10 and then to the turbine 26, the invention could also be practiced by directing the combustion gas from the combustor to the turbine 26 first, for expansion therein, and then directing the expanded gas to the heat exchanger 10, as discussed below in connection with the embodiment shown in FIG. 4, for example.

Figure 3:
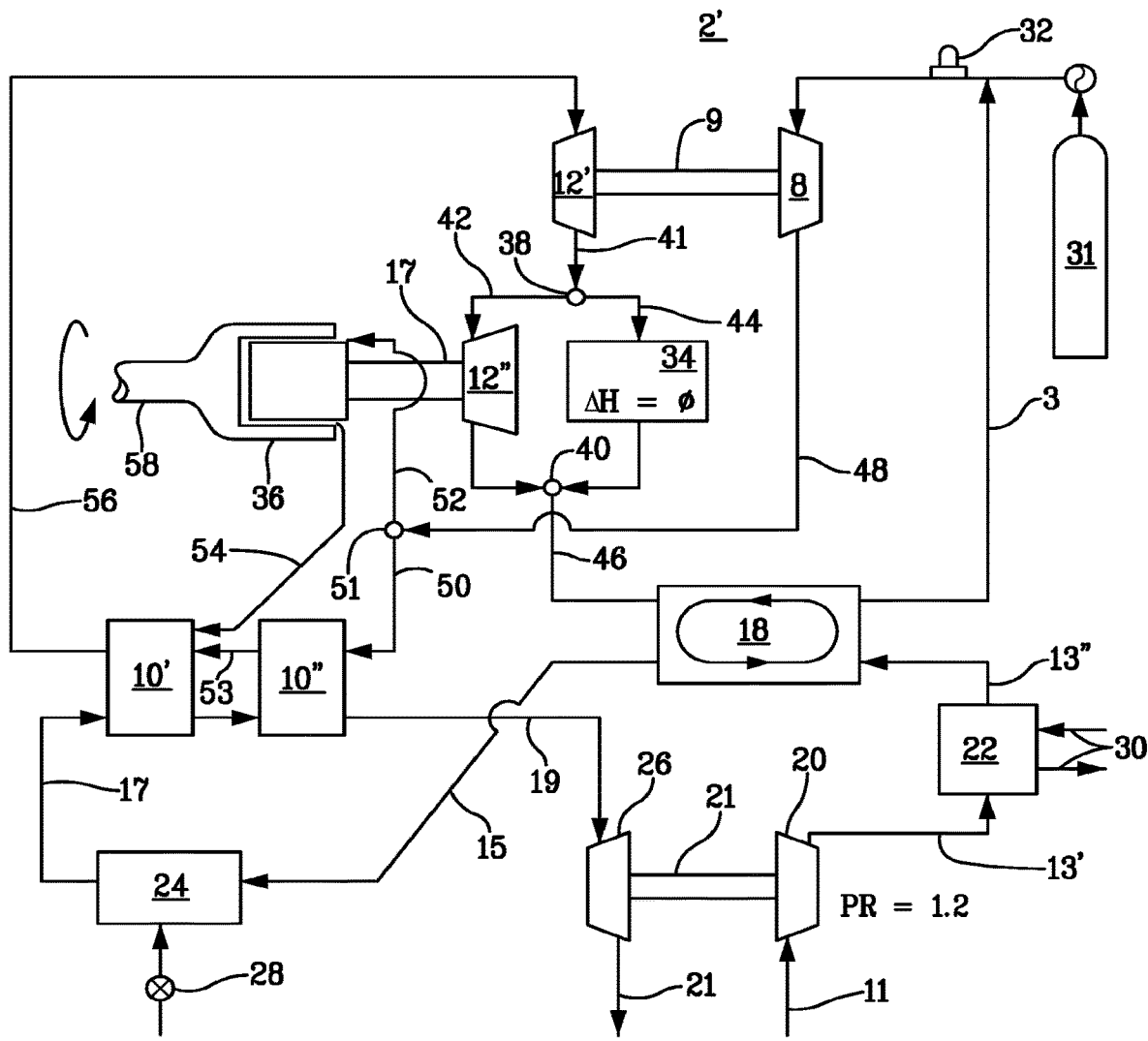
FIG. 3 is a schematic diagram of an alternate embodiment of a power generation system according to the current invention.

Another embodiment of the current invention is shown in FIG. 3, with similar components identified by similar reference numerals. In this embodiment, a cooler 22, supplied with a cooling fluid 30, such as water from a cooling tower in a land based application or air cooler in an aviation application, is used to control the temperature of the air 13' discharging from the air compressor 20 prior to its introduction into heat exchanger 18 so as to control the temperature of the SCO2 entering the SCO2 compressor 8. As previously discussed, preferably, the temperature of the SCO2 entering the compressor 8 is controlled to close to its critical temperature. This temperature control may be effected by controlling the flow rate and/or temperature of cooling fluid supplied to the cooler 22.

In the FIG. 3 embodiment, two SCO2 turbines are utilized. The first turbine 12' is a SCO2 compressor turbine that drives the SCO2 compressor 8, while the second SCO2 turbine 12" is a power turbine that provides the power output of the system. Further, in this embodiment, the flow 41 of SCO2 exhausting from the SCO2 compressor turbine 12' can be divided by a valve 38 into two streams. A first stream 42 can be directed for expansion in the power turbine 12", while a second stream 44 can be directed to an isenthalpic expansion nozzle 34 that reduces the pressure of the SCO2 to close to that of the inlet pressure of the SCO2 compressor 8. These two streams are joined at junction 40 and the combined stream directed to heat exchanger 18 as before. Note that although the nozzle 34 is shown in FIG. 3 as being utilized so that a portion of the SCO2 bypasses the second SCO2 turbine 12", the nozzle 34 could also be incorporated into an embodiment like that shown in FIG. 1 in which only one SCO2 turbine is utilized so that a portion of the SCO2 directed to the nozzle bypassed that single SCO2 turbine.

Although it may decrease efficiency, diverting a portion 44 of the SCO2 discharged from the SCO2 compressor turbine 12' so that it bypasses the power turbine 12" allows the system to maintain optimum efficiency when there is little or no load on the power turbine 12" by maintaining the turbine 12' at its design point inlet temperature and pressure ratio. This not only increases the efficiency of the power turbine 12" but reduces the deleterious effects of thermal cycling on the useful life of the "hot" turbine components. In addition, operation of the valve 38 enables the power turbine 12" to quickly respond to an increase in power demand, and increases the stability of the system in the face of power demand transients. Advantageously, although the pressure of the SCO2 is reduced in the isenthalpic expansion nozzle 34, its temperature remains high so that the unused heat is returned to the system in heat exchanger 18, increasing the temperature of the air directed to the combustor 24 and, therefore, reducing the fuel that must be burned to achieve the desired combustor outlet temperature. Note that although the expansion nozzle 34 is depicted in FIG. 3 as receiving a stream 42 of partially expanded SCO2 from the first turbine 12' of a system employing two SCO2 turbines 12' and 12", the expansion nozzle 34 could also be incorporation into a system employing only one SCO2 turbine 12, such as that shown in FIG. 1, so that a portion of the SCO2 from the heat exchanger 10 bypassed the turbine 12 and was directed, after expansion, to the heat exchanger 18.

Another refinement in the system shown in FIG. 3 is the use of two heat exchangers 10' and 10" to transfer heat from the combustion gas to the SCO2 discharging from the SCO2 compressor 8. Since the temperatures of the SCO2 and combustion gas in the heat exchanger 10" are lower than in heat exchanger 10', this arrangement allows less expensive materials to be used in the heat exchanger 10".

As discussed further below, according to one embodiment of the invention, an eddy current coupling 36 is used to transmit power from the power turbine shaft 17 to the driven shaft 58, which may be the shaft of a turboprop or an electrical generator, for example. Consequently, a portion 52 of the SCO2 stream 48 discharging from the SCO2 compressor 8 is directed by a valve 51 to the eddy current coupling for cooling purposes, while the remaining portion 50 of SCO2 stream 48 is directed to heat exchanger 10". Preferably, after absorbing heat in the eddy current coupling 36, the stream 54 of heated SCO2 is directed to heat exchanger 10', where it mixes with stream 53, for further heating and then expansion in the SCO2 turbines so that the heat absorbed from the coupling is not lost from the system.

Figure 4:
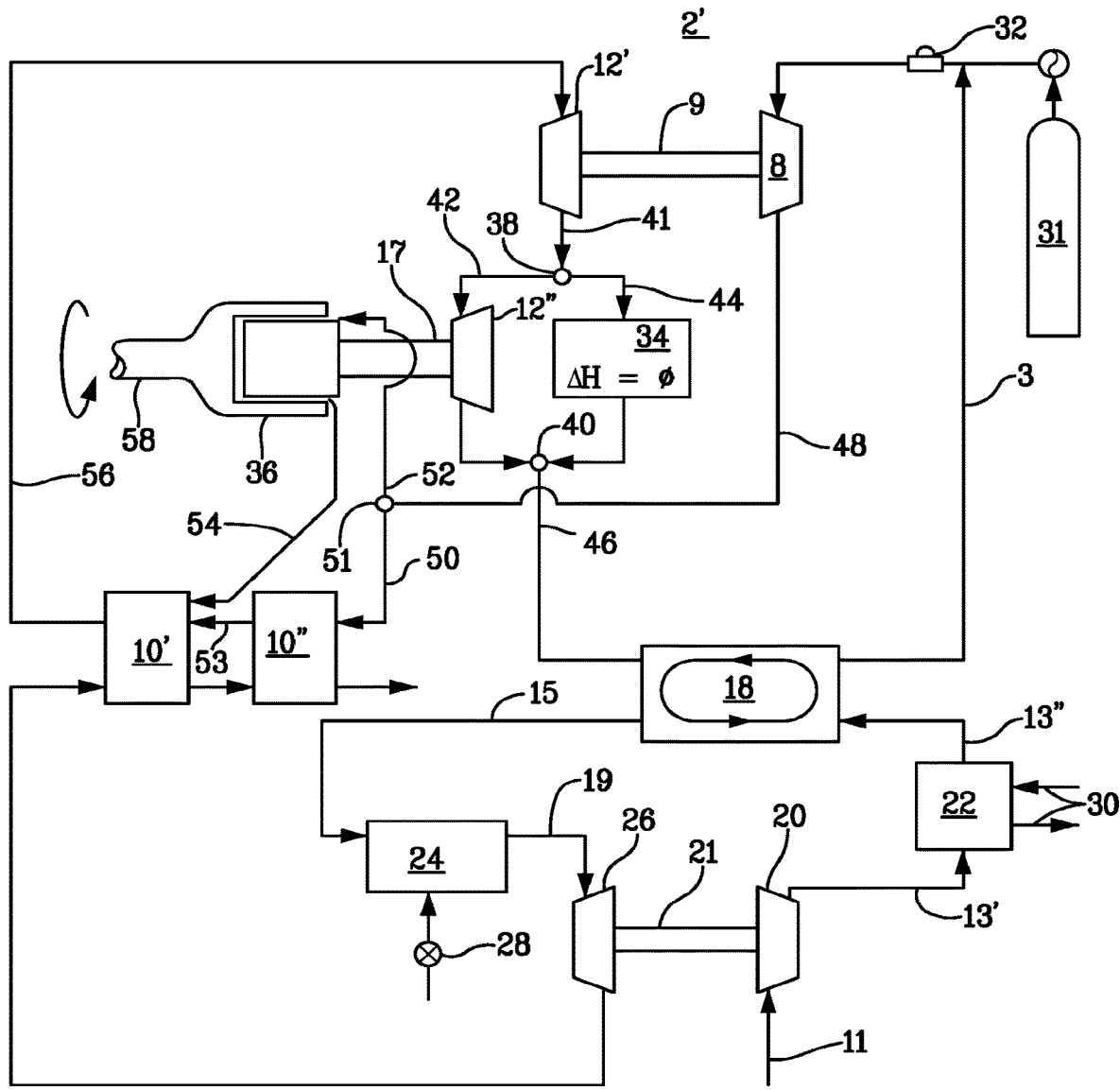
FIG. 4 is a schematic diagram of another alternate embodiment of a power generation system according to the current invention.

FIG. 4 illustrates a variation on the FIG. 3 embodiment that may be particularly useful in land based applications, in which the compression ratio in the air compressor 20 must be kept low in order to maintain a lower compressor discharger temperature so as to achieve maximum heat transfer in the heat exchanger 18. In this embodiment, the combustion gas discharged from the combustor 24 is first expanded in the air turbine 26 and then subsequently directed to the heat exchangers 10' ad 10" for transfer of heat to the SCO2 discharged by the SCO2 compressor 8. After flowing through the heat exchangers 10' and 10", the cooled combustion gas is exhausted to atmosphere.

Figure 5:
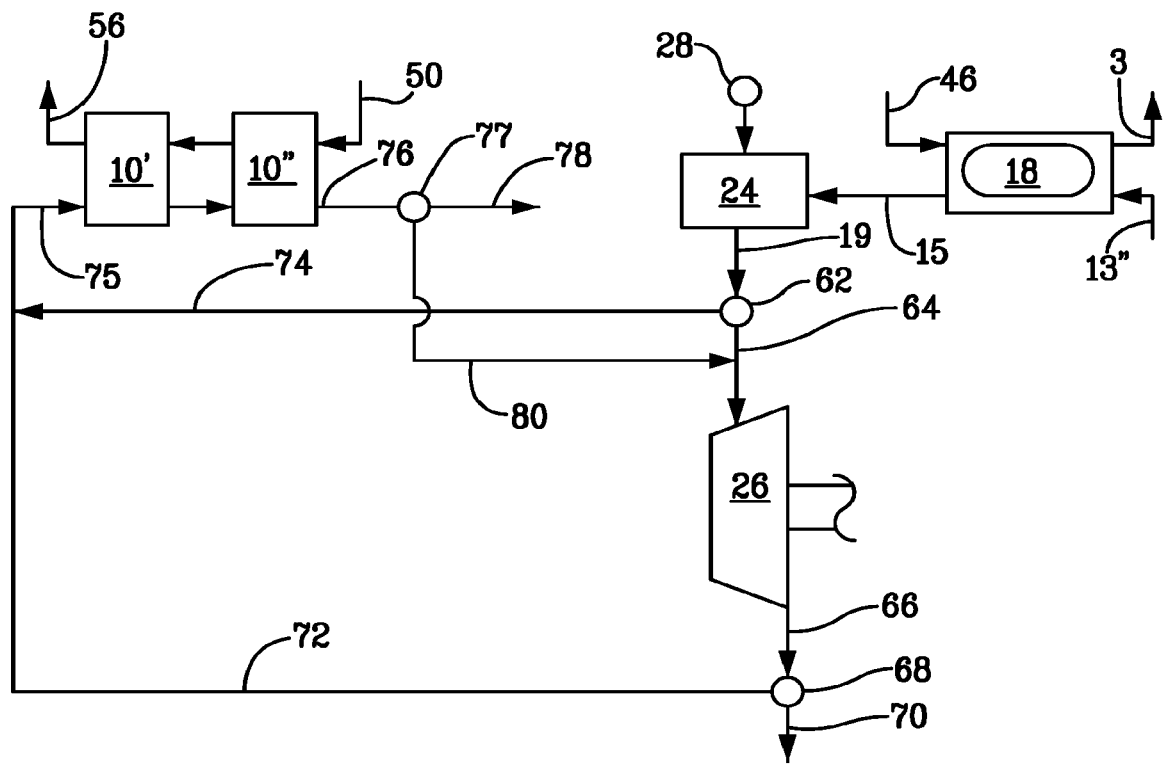
FIG. 5 is a schematic diagram of portion of another alternate embodiment of a power generation system according to the current invention.

FIG. 5 shows a portion of a system similar to the FIGS. 3 and 4 embodiments—the portions of the system not shown in FIG. 5 are the same as those in FIGS. 3 and 4. The embodiment shown in FIG. 5 allows the flexibility of operation according to either the FIG. 3 or FIG. 4 embodiments, or a combination of the two embodiments, so as to facilitate maximum performance either at high altitudes or sea level. In this embodiment, a first valve 62 is incorporated into the flow path downstream of the combustor 24, a second valve 68 is incorporated downstream of the air turbine 26, and a third valve 77 is incorporated downstream of the heat exchanger 10". Operation of valve 62 allows all or a portion of the combustion gases 19 discharging from the combustor 24 to be initially directed either to the air turbine 26 (stream 64) or to the heat exchanger 10' (stream 74). Operation of valve 68 allows all or a portion of the gas 66 exhausting from the air turbine 26 to be directed either to the heat exchanger 10' (stream 72) or exhausted to atmosphere (stream 70). Operation of valve 77 allows all or a portion of the gas discharged from heat exchanger 10" to be directed either to the air turbine 26 (stream 80) or exhausted to atmosphere (stream 78). The flow splits provided by the valves 62, 68 and 74 can be adjusted continuously in order to achieve peak efficiency depending on atmospheric conditions.

In general, expanding the combustion gas in the turbine 26 before cooling it in the cross cycle heat exchangers 10' and 10" provides improved performance in land based applications, and at sea level or low altitude in aviation applications, whereas cooling the combustion gas in the cross cycle heat exchangers before expanding it in the turbine yields better results at altitude.

Figure 6:
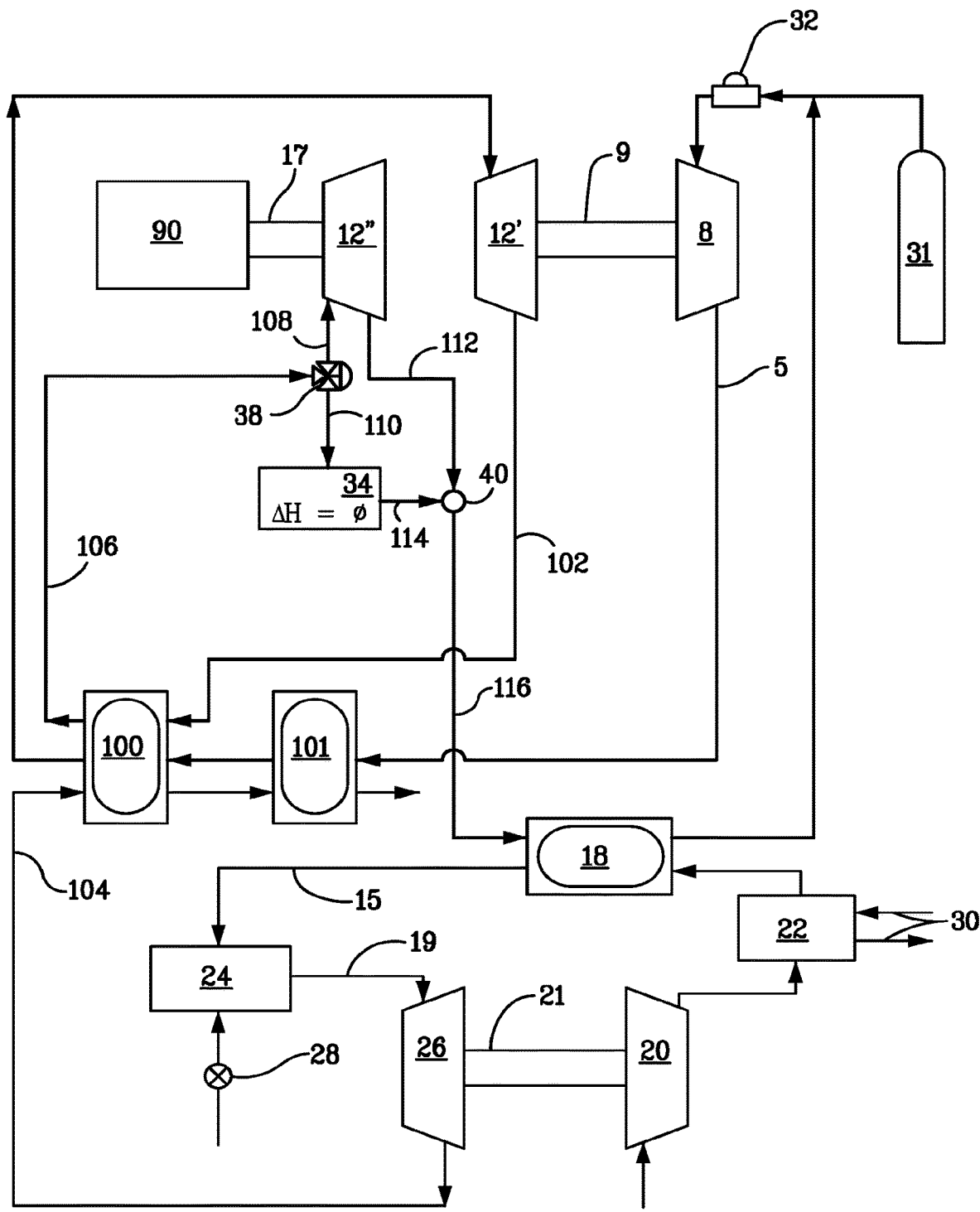
FIG. 6 is a schematic diagram of another alternate embodiment of a power generation system according to the current invention using reheat of the supercritical fluid.

FIG. 6 illustrates an embodiment of the invention that is similar to FIG. 4 but which incorporates reheating of the SCO2. In this embodiment, the stream 5 of compressed SCO2 discharged from the SCO2 compressor 8 is directed to heat exchangers 100 and 101, where it is heated by the transfer of heat from the combustion gas 104 exhausted from the air turbine 26 and then expanded in the SCO2 compressor turbine 12', as before. However, after being expanded in the SCO2 compressor turbine 12', the stream 102 of partially expanded SCO2 is again directed to heat exchanger 100, where it is reheated by the transfer of heat from the combustion gas 104 exhausted from the air turbine 26, thereby reheating the SCO2. From the heat exchanger 100, the stream 106 of reheated SCO2 is directed to the splitter valve 38, as before, so that, if desired, the flow can be divided between a first stream 108 that is expanded in the power turbine 12" and a second stream 110 that is expanded in the isenthalpic expansion nozzle 34. The streams 112 and 114 of expanded SCO2 are then combined as stream 116 and directed to the heat exchanger 18 where the SCO2 is cooled by the transfer of heat to the air discharging from the air compressor 20. Reheating the SCO2 after expansion in the SCO2 compressor turbine 12' but prior to expansion in the power turbine 12" in this embodiment has the advantage of increasing the overall thermal efficiency of the system by an expected amount of about 2%. In this embodiment, power from the power turbine shaft 17 drives an electric generator 90. However, it should be understood that this system, as well as the systems described below, can be used in any application requiring the use of shaft power.

Figure 7:
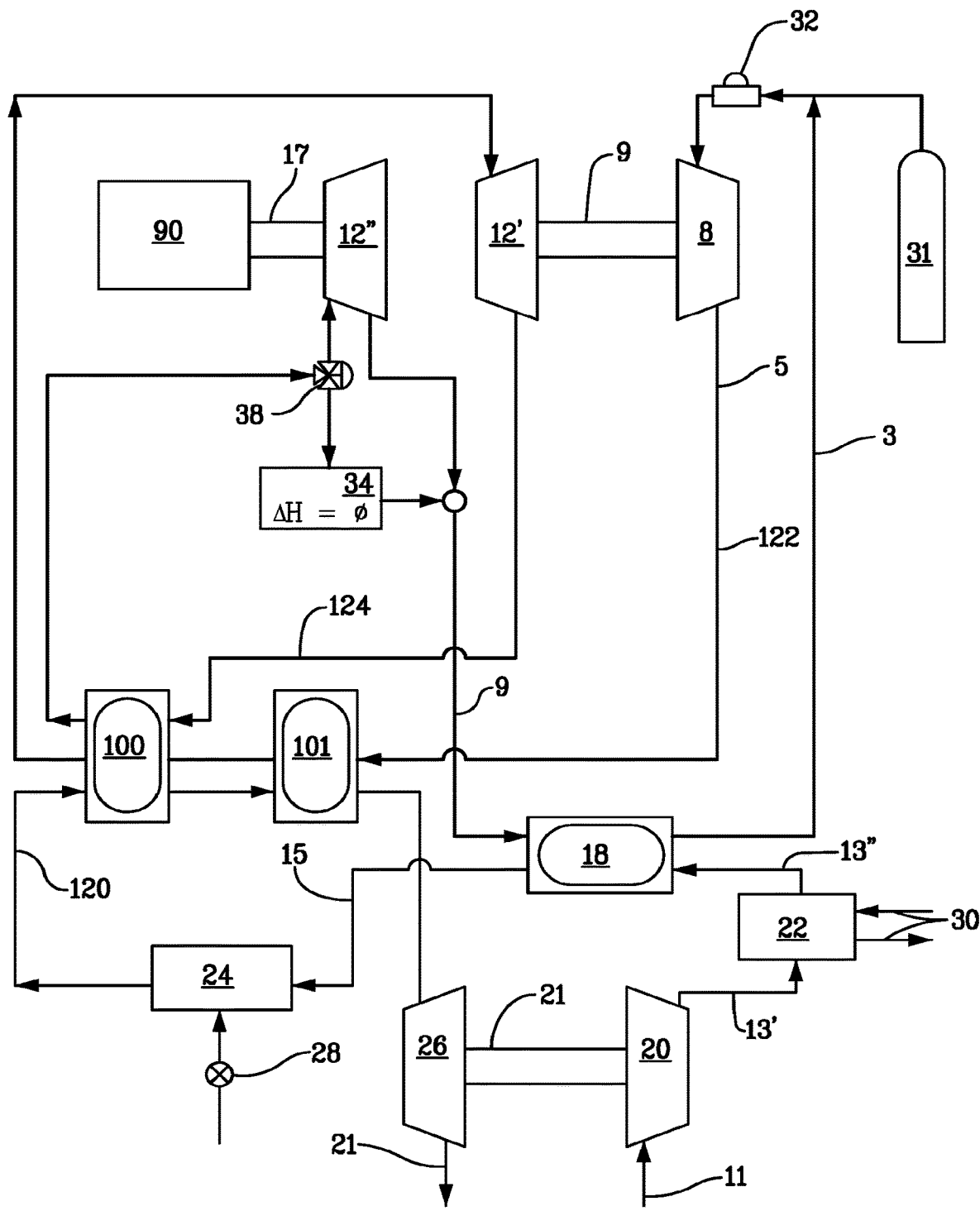
FIG. 7 is a schematic diagram of another alternate embodiment of a power generation system according to the current invention using reheat of the supercritical fluid.

The embodiment illustrated in FIG. 7 is similar to that of FIG. 3 except that the combustion gas 120 from the combustor 24 heats both the compressed SCO2 from the SCO2 compressor 8 and reheats the SCO2 124 exhausted from the SCO2 compressor turbine 12' in heat exchanger 100 as in the FIG. 6 embodiment.

As discussed in connection with the embodiment shown in FIG. 5, valves could be incorporated into the flow path of the embodiments shown in FIG. 6 or 7 so that operation could be shifted from that of FIG. 6, in which combustion gases are expanded in the air turbine 26 before being directed to the heat exchangers 100 and 101, to that of FIG. 7, in which combustion gases are directed to heat exchangers 100 and 101 before being expanded in the air turbine 26. Alternatively, the valves could be operated so that the system operated in both modes simultaneously, with the split between the two modes being varied as necessary to achieve optimum performance.

Figure 8:
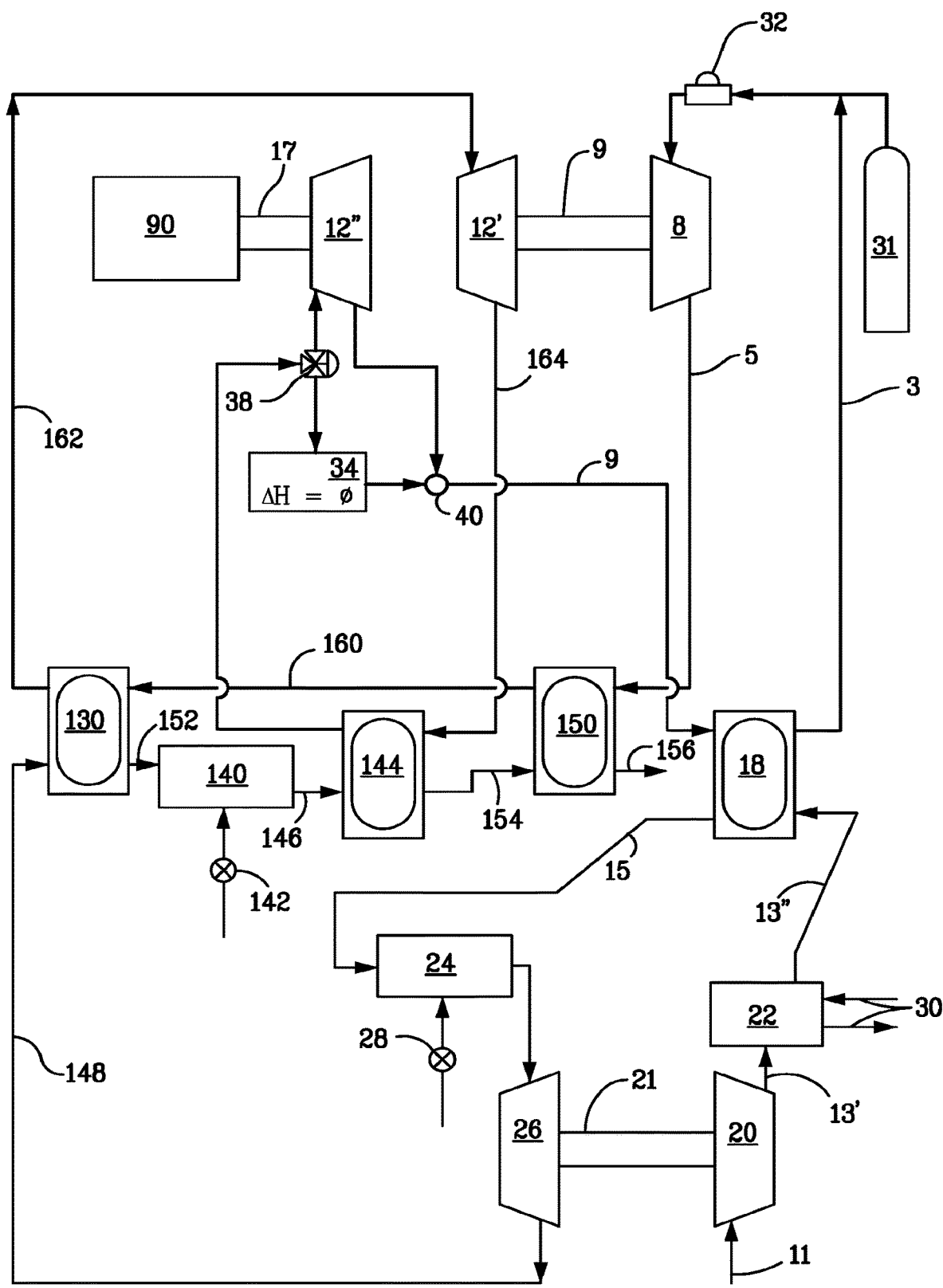
FIG. 8 is a schematic diagram of another alternate embodiment of a power generation system according to the current invention using reheat of the combustion gas.

In the embodiment illustrated in FIG. 8, which bears similarities to that of the FIG. 6 embodiment, the stream 5 of compressed SCO2 discharged by the SCO2 compressor 8 is sequentially heated in heat exchangers 150 and 130, and the heated SCO2 is then expanded in the SCO2 compressor turbine 12', as before. In heat exchanger 130, heat is transferred to the SCO2 from the combustion gas 148 exhausted from the air turbine 26, as before. However, in this embodiment, the partially cooled combustion gas 152 exiting the heat exchanger 130 is reheated in reheat combustor 140 by burning additional fuel in the combustion gas under the operation of a fuel control 142. From the reheat combustor 140 the reheated combustion gas 146 is then directed to heat exchanger 144, which heats the SCO2 discharged from the SCO2 compressor turbine 12' prior to its expansion in the power turbine 12" (or its expansion in the nozzle 34). The combustion gas 154 discharged from heat exchanger 144 is then directed to heat exchanger 150, in which it transfers heat to the SCO2 compressor discharge 5, and the combustion gas 156 is then exhausted to atmosphere. This arrangement has the benefit again of increasing the overall thermal efficiency of a system without reheat by an expected amount of about 2%.

Figure 9:
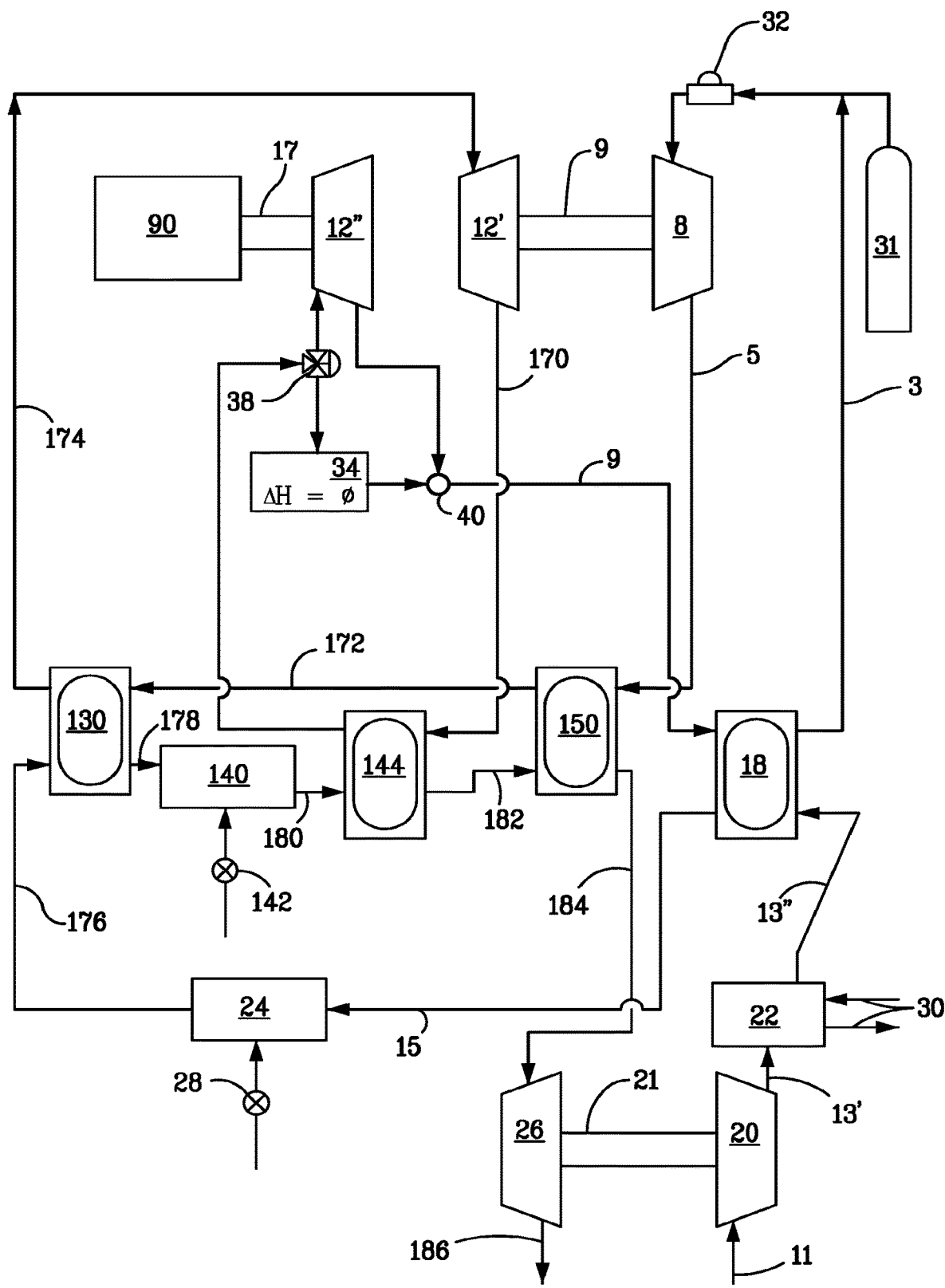
FIG. 9 is a schematic diagram of another alternate embodiment of a power generation system according to the current invention using reheat of the combustion gas.

In the embodiment illustrated in FIG. 9, which bears similarities to that of the FIG. 7 embodiment, the stream 5 of compressed SCO2 discharged by the SCO2 compressor 8 is sequentially heated in heat exchangers 150 and 130, and the heated SCO2 is then expanded in the SCO2 compressor turbine 12', as before. In heat exchanger 130, heat is transferred to the SCO2 from the combustion gas 176 from the combustor 24, as before. However, the partially cooled combustion gas 178 exiting the heat exchanger 130 is then reheated in reheat combustor 140 by burning additional fuel in the combustion gas under the operation of a fuel control 142. From the reheat combustor 144, the reheated combustion gas 180 is directed to heat exchanger 144, which heats the SCO2 discharged from the SCO2 compressor turbine 12' prior to its expansion in the power turbine 12" (or its expansion in the nozzle 34). The combustion gas 182 is then directed to heat exchanger 150, in which it transfers heat to the SCO2 compressor discharge 5, and the combustion gas 184 is then expanded in the air turbine 26, after which the combustion gas 186 is exhausted to atmosphere. This arrangement has the benefit of raising the overall thermal efficiency of a system without reheat by an expected amount of about 2%.

As discussed in connection with the embodiment shown in FIG. 5, valves could be incorporated into the flow path of the embodiments shown in FIG. 8 or 9 so that operation could be shifted from that of FIG. 8 to that of FIG. 9. Alternatively, the valves could be operated so that the system operated in both modes simultaneously, with the split between the two modes being varied as necessary to achieve optimum performance.

Figure 10:
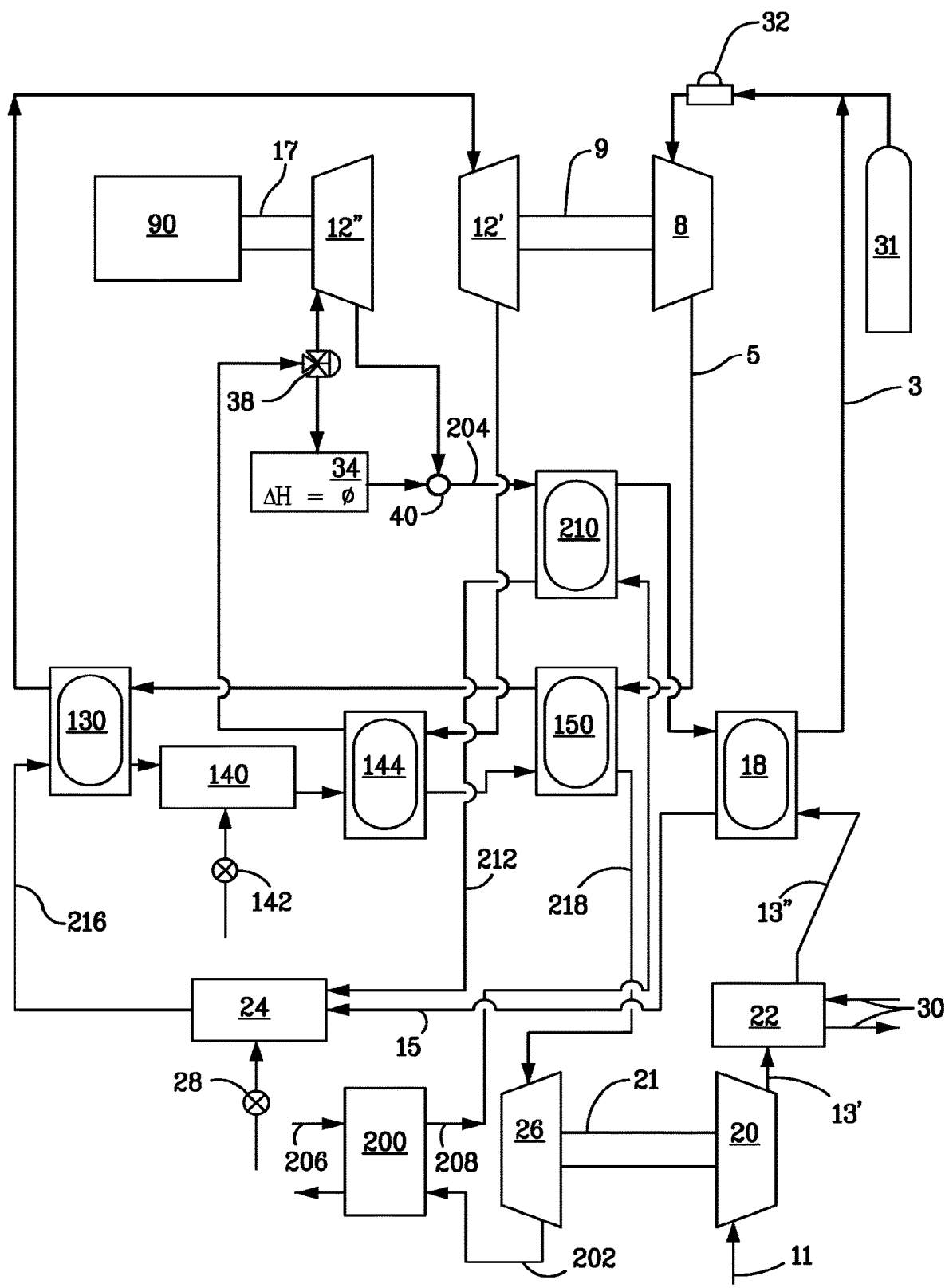
FIG. 10 is a schematic diagram of another alternate embodiment of a power generation system according to the current invention incorporating steam injection.

The embodiment shown in FIG. 10 is similar to that shown in FIG. 9 except that the combustion gas 202 expanded in the air turbine 26 is directed to a water boiler 200 before being exhausted to atmosphere. The water boiler 200 transfers heat from the combustion gas to water 206, thereby generating steam 208. The steam 208 is directed to a heat exchanger 210 where it is superheated by the transfer of heat from the stream 204 of SCO2 expanded by the power turbine 12" (or expansion nozzle 34) prior to introduction into the heat exchanger 18. The superheated steam 212 is then injected into the combustor 24 along with the fuel, thereby increasing the mass flow of the combustion gas 216 directed through the heat exchangers 130, 144 and 150 and the air turbine 26. Although the injection of the steam 212 into the combustor 24 increases the fuel required to achieve a given combustor outlet temperature, since the additional heat recovered from the air turbine exhaust gas 202 by the water boiler 200 is returned to the cycle, the efficiency is increased. The injection of steam in the combustor can also reduce the generation of NOx, a pollutant.

Figure 11:
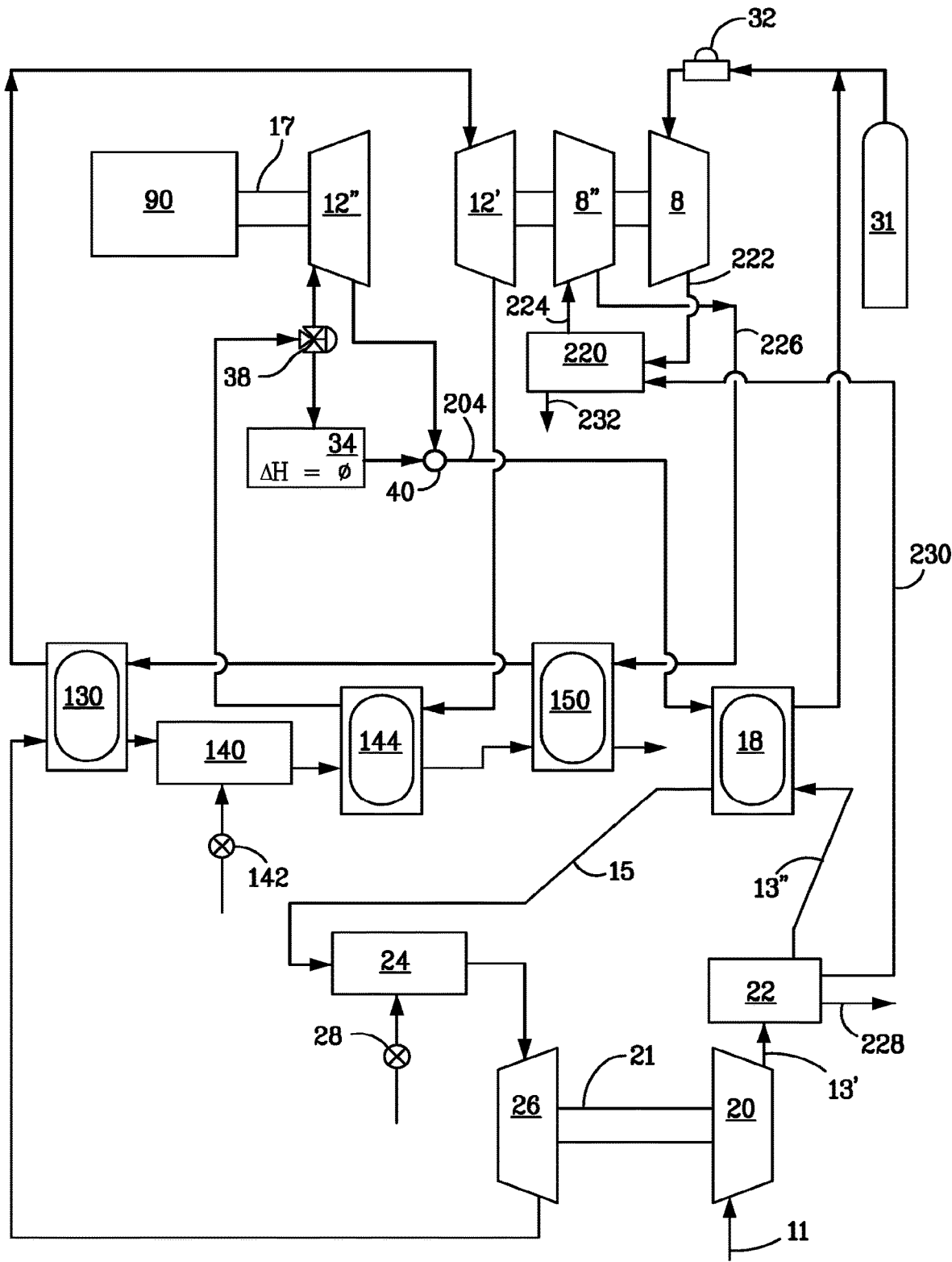
FIG. 11 is a schematic diagram of another alternate embodiment of a power generation system according to the current invention that also generates hot water.

FIG. 11 illustrates an embodiment of the invention in which both electrical power and hot water, for example for district heating, are generated. In this embodiment, heat is transferred to ambient water 228 supplied to the airside cooler 22 to lower the temperature of the compressed air 13' discharging from the air compressor 20 prior to its introduction into the heat exchanger 18, as previously discussed. The slightly heated water 230 discharged from the airside cooler 22 is then directed to an SCO2 intercooler 220 positioned between first and second SCO2 compressors 8' and 8" connected in series. Partially compressed SCO2 222 is directed from the first compressor 8' to the SCO2 intercooler 220 in which heat is transferred from the partially compressed SCO2 to the incoming water 230. After cooling, the cooled SCO2 224 discharged from the first compressor 8' is then directed to the second compressor 8", where it undergoes compression to its desired value. In this embodiment, the heated water 232 discharged from the SCO2 intercooler 220 can advantageously be used for heating purposes.

Note that the benefit of compressor interstage cooling is well known as it reduces the amount of work required to achieve a desired pressure ratio at the compressor discharge. In the embodiment shown in FIG. 11, the SCO2 intercooler 220 is designed to reduce the temperature of the interstage SCO2 222 to just above its supercritical temperature, which results in an expected reduction of nearly 25% in the power required to achieve the desired pressure. Further, the characteristic intercooler inlet and outlet temperatures of the SCO2 lend themselves to heating water as part of a combined heat and power implementation. Heating of the water 228 in the airside cooler 22 raises the temperature of the water only slightly since, in one embodiment for example, the heat transferred in the airside cooler 22 is only about 13 KW per Kg/s of SCO2 mass flow. By varying the percentage of work done by the SCO2 compressors 8' and 8" (in other words varying the ratio of pressure ratios) the amount of heat extracted in the SCO2 intercooler 220 can be varied from, for example, 20 KW per Kg/s to about 150 KW per Kg/s. Thus, the magnitude of the heat transferred to water can be about the same as the heat transfer generating power. This differs substantially from conventional combined heat and power systems since they generally generate about two times as much heat as electricity. In one embodiment of the system shown in FIG. 11, the water 230 discharged from the airside cooler 22 flows to the SCO2 intercooler 220, where up to about 150 KW is extracted in order to lower the temperature of the SCO2 to close to its critical temperature of about 305° K. The heat transfer in the SCO2 intercooler 220 raises the temperature of the water 232 discharged from the SCO2 in cooler 220 to about 160° F., which is quite suitable for heating and cooling (trigeneration) applications.

Note too that the SCO2 intercooler 220 results in lowering the temperature of the stream 226 of SCO2 discharged by the compressor 8", which would require an increase in the amount of heat input to the compressor discharge stream, and by implication, the amount of fuel burned in the combustor 24 to achieve the desired inlet temperature in the SCO2 turbine 12'. However, in this case, the heat source for the SCO2 is the flow of combustion gases from the combustor 24 so the reduced SCO2 compressor discharge temperature merely results in a reduction in the temperature of the combustion gas exhausted to atmosphere from the air turbine 26, requiring little to no increase in fuel flow to the combustor 24. The embodiment illustrated in FIG. 11 can simultaneously provide hot water for heating applications plus electricity at high efficiency so that an overall thermal efficiency on the order of 90% is expected.

Although the embodiment in FIG. 11 has been depicted in a system in which the combustion gas from the combustor 24 is first directed to the turbine 26 for expansion therein and then directed to the heat exchanger 130, the invention could also be practiced by directing the combustion gas from the combustor to the heat exchanger 130 first and then directing the combustion gas to the turbine 26 as shown, for example, in the embodiment shown in FIG. 3.

Figure 12:
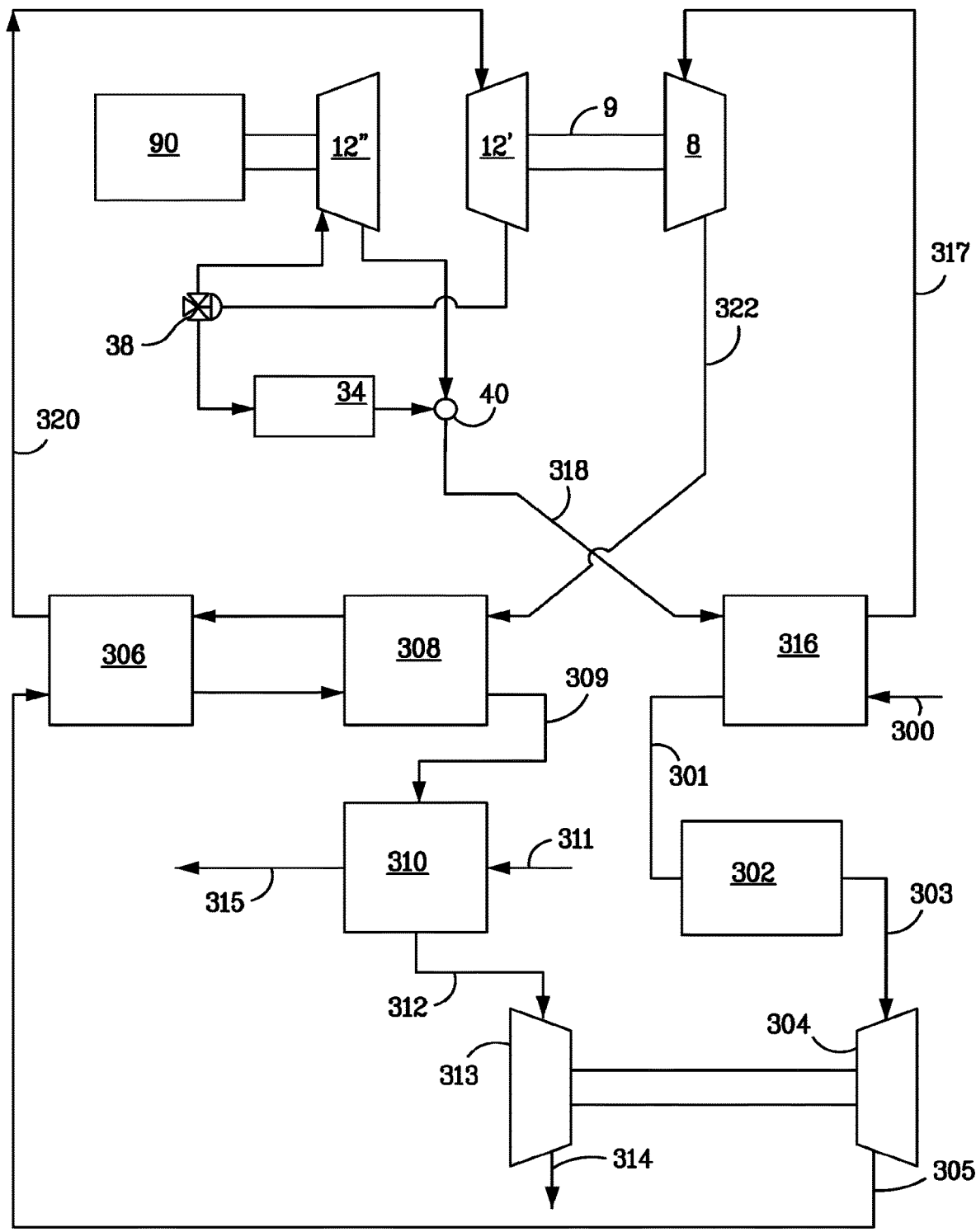
FIG. 12 is a schematic diagram of another alternate embodiment of a power generation system according to the current invention that also generates hot water and uses a vacuum cycle.

FIG. 12 illustrates another embodiment of the invention applied to a combined heat and power system making use of a vacuum cycle. Ambient air—that is, air at ambient temperature and pressure—300 is drawn into a cross cycle heat exchanger 316 in which it absorbs heat from the expanded SCO2 318 discharged from the SCO2 power turbine 12", thereby cooling the SCO2 317 directed to the SCO2 compressor 8 to close to it critical temperature. The heated air 301 from the heat exchanger 316 is then further heated in the combustor 302 by burning a fossil fuel (not shown). The resulting combustion gas 303 is then expanded in a turbine 304 to below atmospheric pressure and the expanded gas 305 is directed to cross cycle heat exchangers 306 and 308 where it transfers heat to the compressed SCO2 322 discharged from the SCO2 compressor 8. Although two cross cycle heat exchangers in series are shown in FIG. 12, the invention could also be practiced using a single heat exchanger or more than two heat exchangers in series. The heated SCO2 320 is then expanded in the turbines 12' and 12" so as to generate shaft power to drive the SCO2 compressor 8 and, for example, an electric generator 90, as previously discussed. Since this embodiment, as well as the embodiment shown in FIG. 13 discussed below, uses ambient air 300 as the cooling fluid in the cross cycle heat exchanger 316, rather than compressor discharge air, to cool the SCO2 317 returned to the compressor inlet, it is not necessary to use a cooler, such as cooler 22 shown in FIG. 11, to cool the air directed to the cross cycle heat exchanger, thereby avoiding the loss of heat from the cycle.

From the heat exchangers 306 and 308 the cooled combustion gas 309 is directed to a water heater 310 supplied with water 311, which may be at ambient temperature. In the water heater 310, heat is transferred from the combustion gas 309 to the water 311 so as to discharge heated water 315. The heated water may be advantageously used for district heating, for example, or for any application making use of heated water. The cooled combustion gas 312 discharged from the water heater 310 is directed to a compressor 313 that increases the pressure of the combustion gas above that of atmospheric pressure so that the combustion gas 314 can be exhausted to atmosphere.

Figure 13:
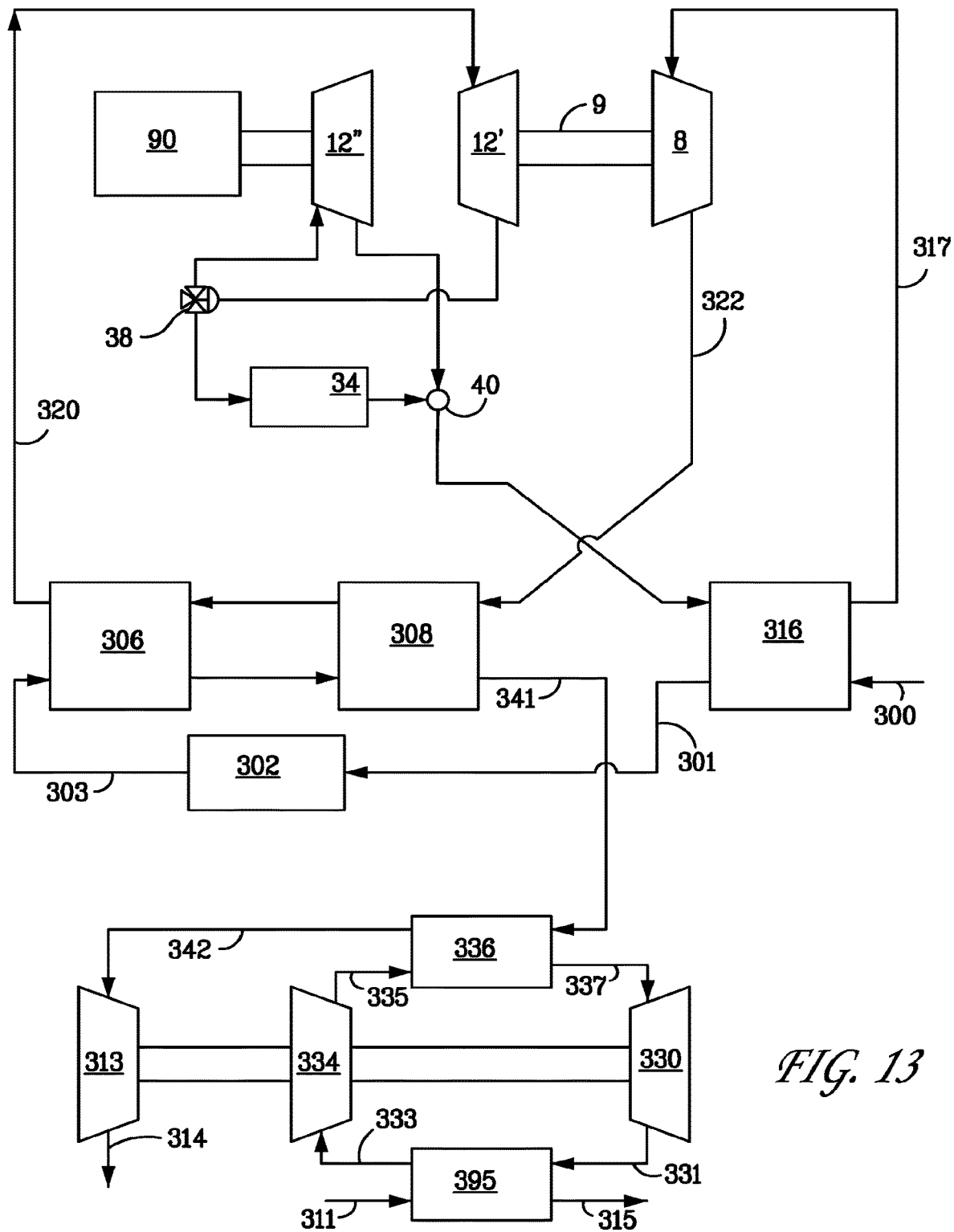
FIG. 13 is a schematic diagram of another alternate embodiment of a power generation system according to the current invention that incorporates a second supercritical fluid cycle.

FIG. 13 illustrates another embodiment of the invention applied to a combined heat and power system making use of a vacuum cycle along with two SCO2 cycles. Ambient air 300 is drawn into a cross cycle heat exchanger 316 in which it absorbs heat from the expanded SCO2 318 discharged from the SCO2 power turbine 12", thereby cooling the SCO2 317 directed to the SCO2 compressor 8 to close to it critical temperature, as before. The heated air 301 from the heat exchanger 316 is then further heated in the combustor 302 by burning a fossil fuel (not shown), as before. The resulting combustion gas 303 is then directed to the cross cycle heat exchangers 306 and 308, rather than to a turbine as in the FIG. 12 embodiment. In the cross cycle heat exchangers 306 and 308, heat is transferred from the combustion gas 303 to the compressed SCO2 322 discharged from the SCO2 compressor 8. The heated SCO2 320 is then expanded in the turbines 12' and 12" so as to generate shaft power to drive the SCO2 compressor 8 and, for example, an electric generator 90, as previously discussed.

From the cross cycle heat exchangers 306 and 308, the partially cooled combustion gas 341 transfers heat to a second SCO2 cycle through which a second stream of SCO2 flows. In particular, the combustion gas 341 is directed to a secondary cross cycle heat exchanger 336 where it is further cooled by transferring heat to SCO2 335 discharged from a secondary SCO2 compressor 334. The further cooled combustion gas 342 is then directed to a compressor 313. As a result of the pressure drop through the heat exchangers, the combustion gas at the compressor inlet will be sub atmospheric. The compressor 313 increases the pressure of the combustion gas above that of atmospheric pressure so that the combustion gas 314 can be exhausted to atmosphere.

The heated SCO2 337 discharged from the secondary cross cycle heat exchanger 336 is expanded in a secondary SCO2 turbine 330, which generates shaft power to drive the secondary SCO2 compressor 334. The expanded SCO2 331 discharged from the turbine 330 is then directed to a water heater 395, where it transfers heat to water 311, thereby cooling the SCO2 333 to close to its critical temperature before it is returned to the secondary SCO2 compressor 334. The heated water 315 may advantageously be used for district heating, for example, as previously discussed.

Figure 14:
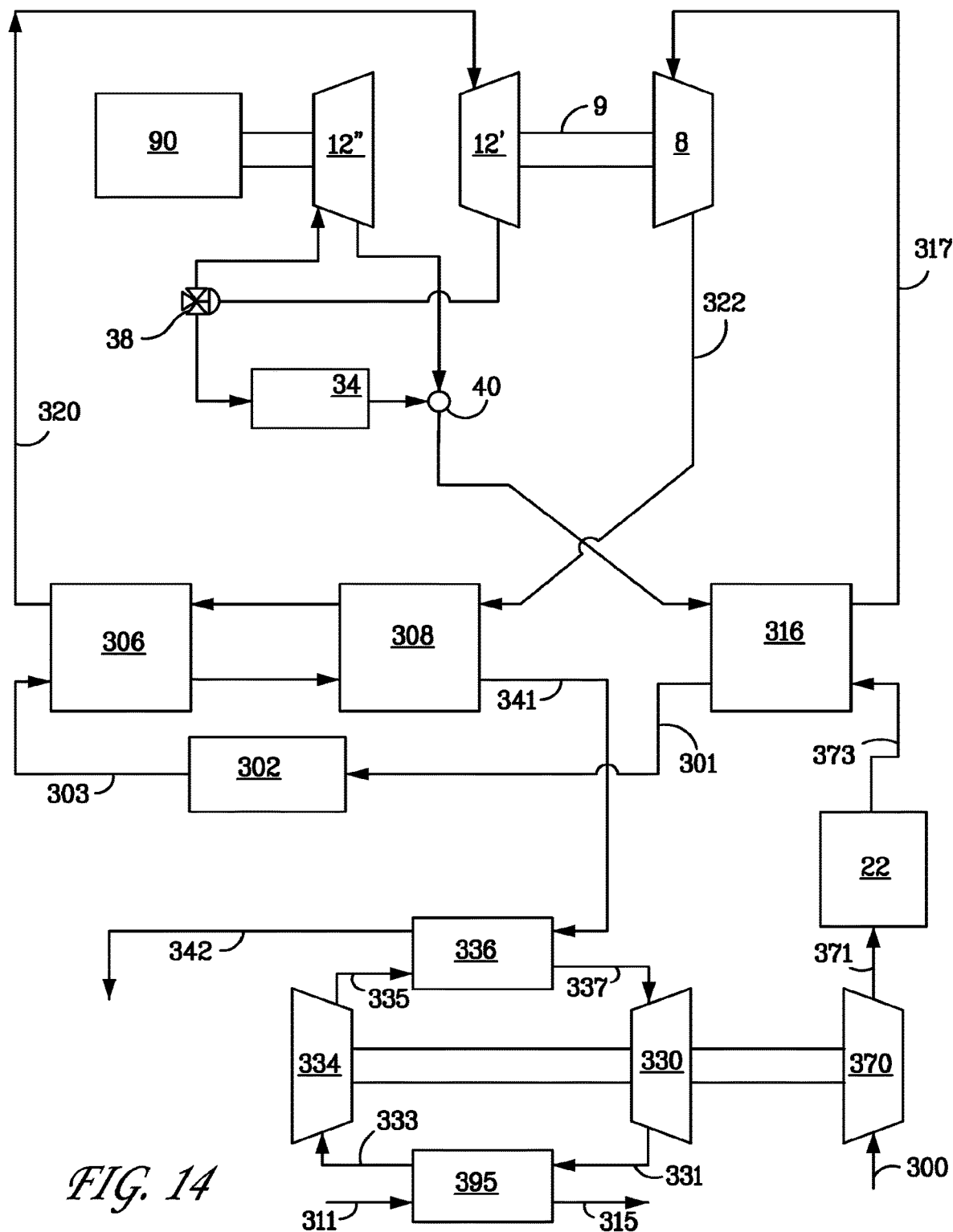
FIG. 14 is a schematic diagram of another alternate embodiment of a power generation system according to the current invention that incorporates a second supercritical fluid cycle.

FIG. 14 illustrates yet another embodiment of the invention applied to a combined heat and power system making use of a vacuum cycle along with two SCO2 cycles. Ambient air 300 is drawn into a compressor 370 and the compressed air is then cooled in a cooler 22 by transferring heat to water (not shown) as in the FIG. 11 embodiment. The cooled compressed air 373 is directed to a cross cycle heat exchanger 316, where heat is transferred to it from the SCO2 so as to cool the SCO2 317 directed to the SCO2 compressor 8 to close to its critical temperature.

The heated air 301 from the heat exchanger 316 is then further heated in the combustor 302 by burning a fossil fuel (not shown), as before. The resulting combustion gas 303 is then directed to the cross cycle heat exchangers 306 and 308 in which heat is transferred from the combustion gas 303 to the compressed SCO2 322 discharged from the SCO2 compressor 8, as in the FIG. 13 embodiment. The heated SCO2 320 is then expanded in the turbines 12' and 12" so as to generate shaft power to drive the SCO2 compressor 8 and, for example, an electric generator 90, as previously discussed.

From the cross cycle heat exchangers 306 and 308, the partially cooled combustion gas 341 transfers heat to a second SCO2 cycle, as in the FIG. 13 embodiment. In particular, the combustion gas 341 is directed to a secondary cross cycle heat exchanger 336 where it is further cooled by transferring heat to SCO2 335 discharged from a secondary SCO2 compressor 334. The further cooled combustion gas 342 is then exhausted to atmosphere.

The heated SCO2 337 discharged from the secondary cross cycle heat exchanger 336 is expanded in a secondary SCO2 turbine 330, which generates shaft power to drive the secondary SCO2 compressor 334 as well as the air compressor 370. The expanded SCO2 331 discharged from the turbine 330 is then directed to a water heater 395, where it transfers heat to water 311, thereby cooling the SCO2 333 to close to its critical temperature before it is returned to the secondary SCO2 compressor 334. The heated water 315 may advantageously be used for district heating, for example, as previously discussed.

It can be noted that whereas in the FIG. 13 embodiment, the air compressor 313 "pulls" the air through the system, in the FIG. 14 embodiment, the air compressor 370 "pushes" the air through the system. Also note that in both the FIGS. 13 and 14 embodiments, the air cycle portion of the system includes a compressor and combustor but no turbine.

Figure 15:
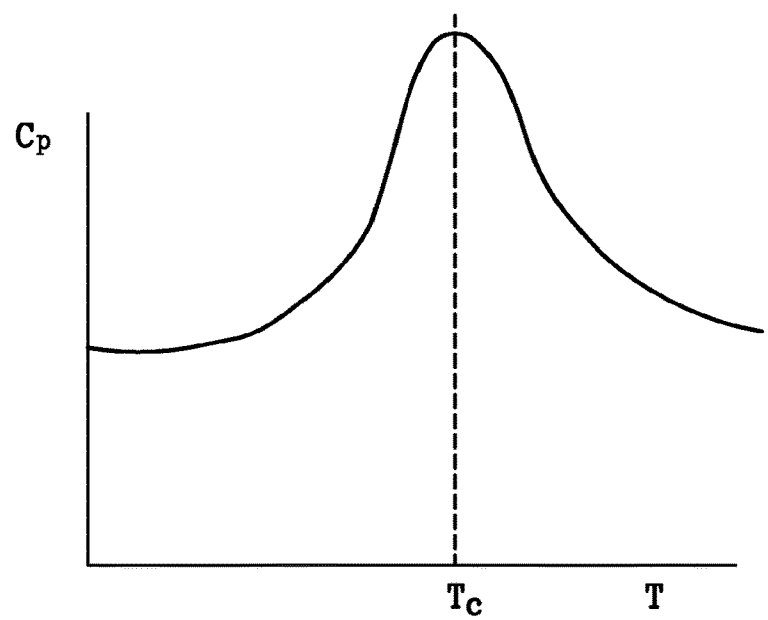
FIG. 15 is a graph showing the change in specific heat $c_p$ of SCO2 as a function of temperature in the vicinity of the critical temperature $T_C$.

As shown in FIG. 15, as is typical for supercritical fluids, the specific heat of SCO2 changes dramatically around its critical temperature. Therefore, as previously discussed, it is important to maintain the temperature of the SCO2 at the SCO2 compressor inlet as close as possible to the critical temperature. In fact, it has been found that the thermal efficiency of the fossil fuel fired, dual cycle, supercritical fluid-air systems described herein can change in the order of a few percent as a result of a change in the temperature of the SCO2 at the inlet to the SCO2 compressor of only a few degrees Kelvin. Unfortunately, thermocouples typically used to measure temperature in gas turbine system are typically accurate to only a few degrees Kelvin. Consequently, according to one aspect of the current invention, methods are provided for more accurately measuring the temperature of the SCO2 at the SCO2 compressor inlet.

Figure 16:
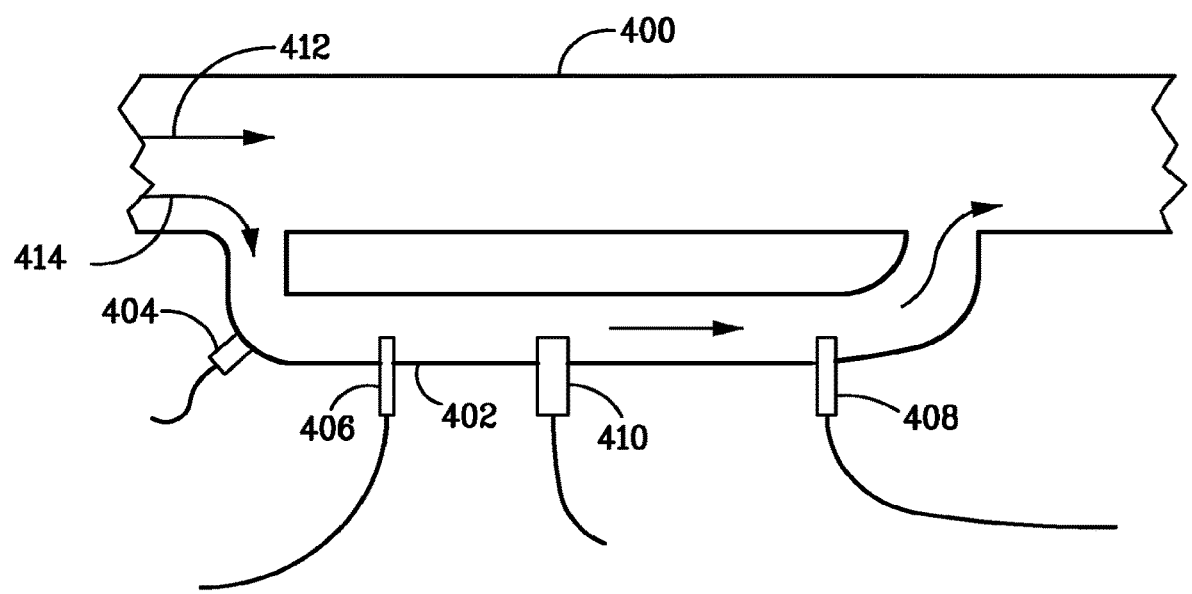
FIG. 16 is a drawing, partially schematic, showing an apparatus for measuring the temperature of SCO2 flowing to the inlet of the SCO2 compressor.

FIG. 16 shows one embodiment of an apparatus for measuring the temperature of the SCO2 entering the SCO2 compressor inlet according to the current invention. A bypass conduit 402 is connected to the main conduit 400 that directs the stream 412 of SCO2 to the inlet of the SCO2 compressor. A bypass stream 414 of SCO2 flows through the bypass conduit 402. A pressure sensor 404, such as a piezo-electric type or other as appropriate, is incorporated into the bypass conduit 402 to measure the static pressure of the SCO2 in the bypass conduit. Upstream and downstream temperature sensors 406 and 408, respectively, which may be thermocouples or other types of temperature sensors, are installed on either side of a heat source 410. The heat source 410, such as an electric coil or ceramic heater, introduces a known amount of heat into the bypass stream 414 of SCO2. Preferably, the temperature sensors 406 and 408 are spaced approximately ½ m apart.

By measuring the temperature of the SCO2 at both temperature sensors 406 and 408 simultaneously when no heat is generated by the heat source 410, so that both sensors are measuring the same total temperature, the temperature sensors can be corrected to account for deviations between the two. The temperature measurements are then repeated while a known amount of heat is being introduced into the SCO2 stream by the heat source 410. The specific heat of the SCO2 can be determined by comparing the increase in temperature between temperature sensors 406 and 408, taking into account the mass flow rate of the SCO2 through the conduit 402, which can be inferred by analysis. This specific heat can then be compared to data for specific heat versus temperature at the static pressure measured by the sensor 404 to accurately determine the temperature of the SCO2 flowing in the main conduit 400.

Figure 17:
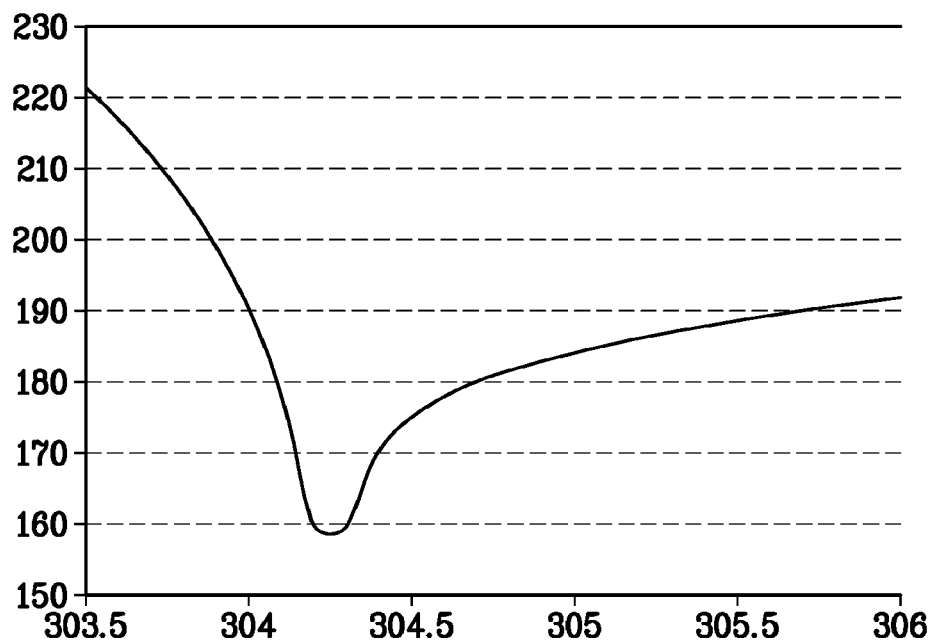
FIG. 17 is a graph of the speed of sound, in m/s, in SCO2 as a function of temperature, in ° K, at 7.4 MPa.
Figure 18:
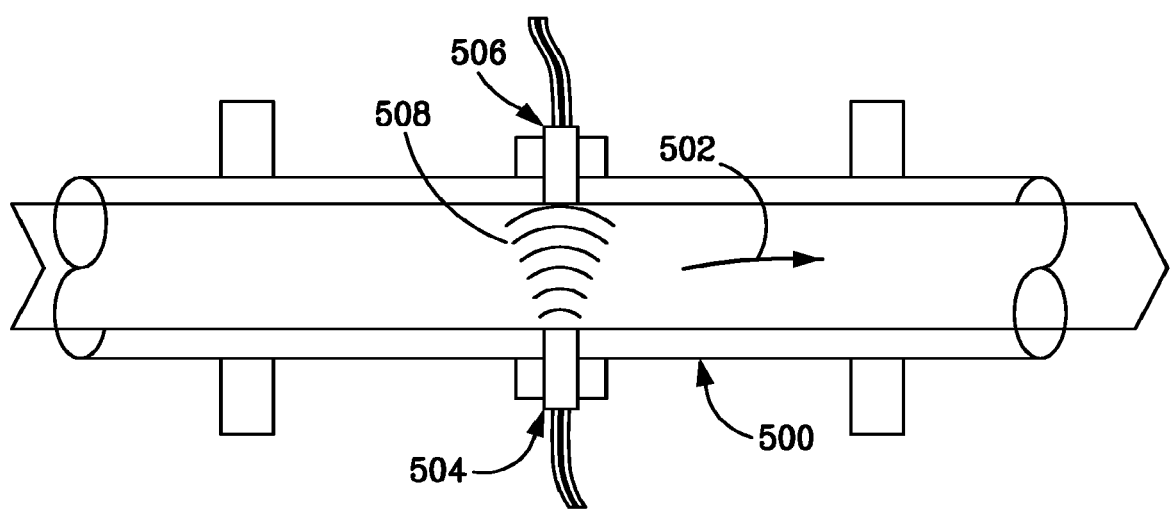
FIG. 18 is a drawing, partially schematic, showing another apparatus for measuring the temperature of SCO2 flowing to the inlet of the SCO2 compressor.
Figure 19:
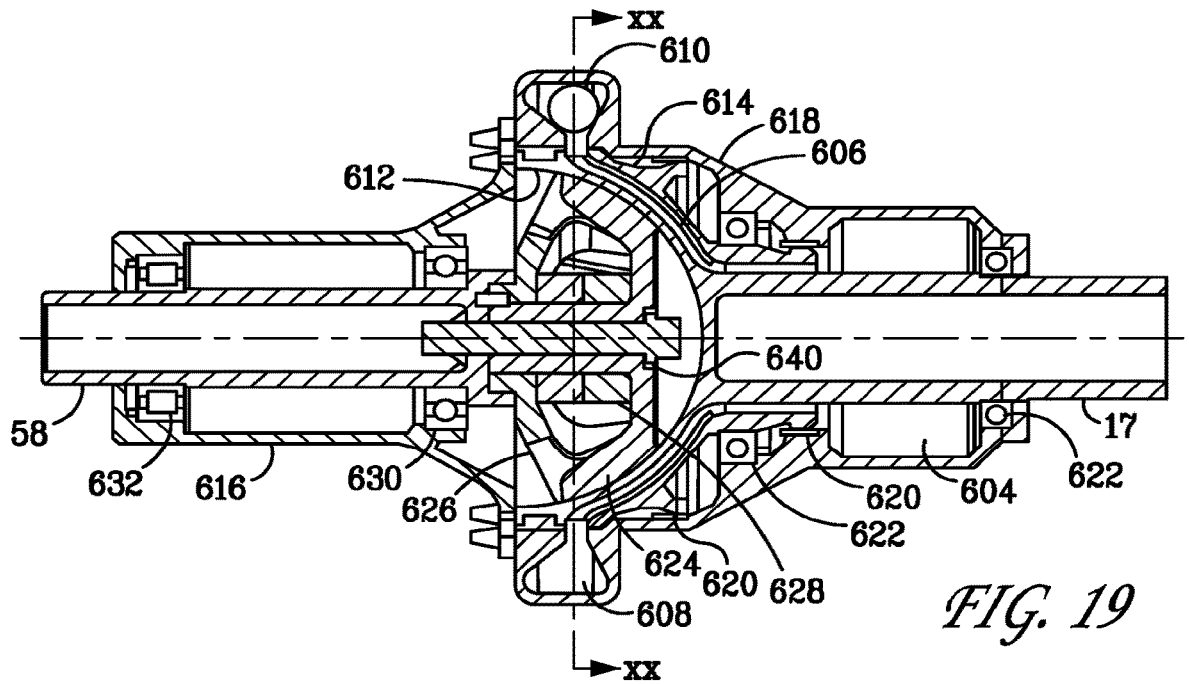
FIG. 19 is a longitudinal cross section through the turbine coupling portion of a power generation system according to the current invention.
Figure 20:
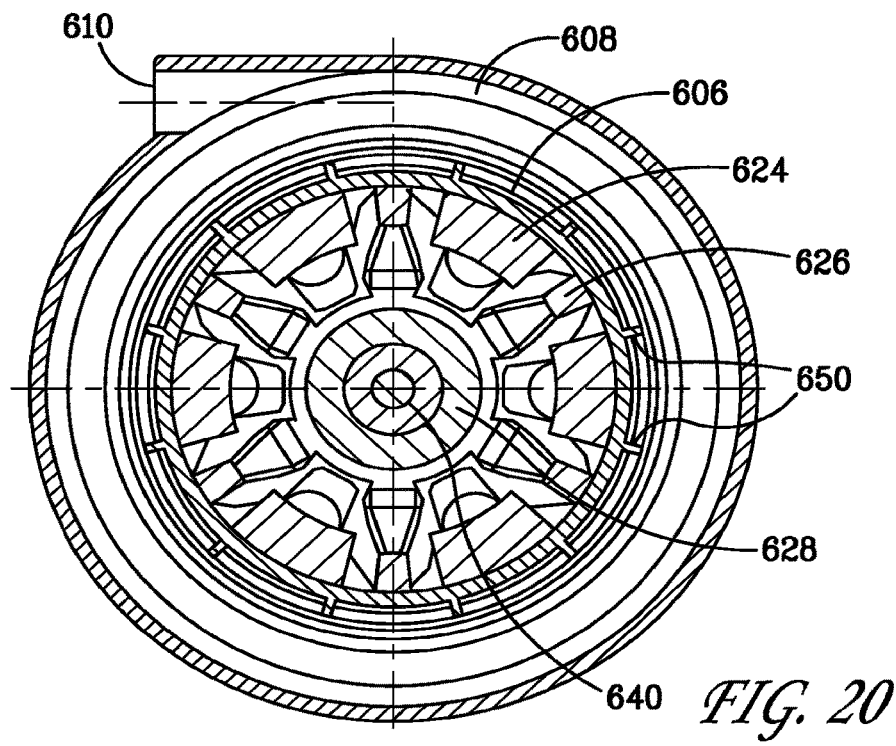
FIG. 20 is a transverse cross section through the turbine coupling shown in FIG. 19, taken along line XX-XX.
Figure 21:
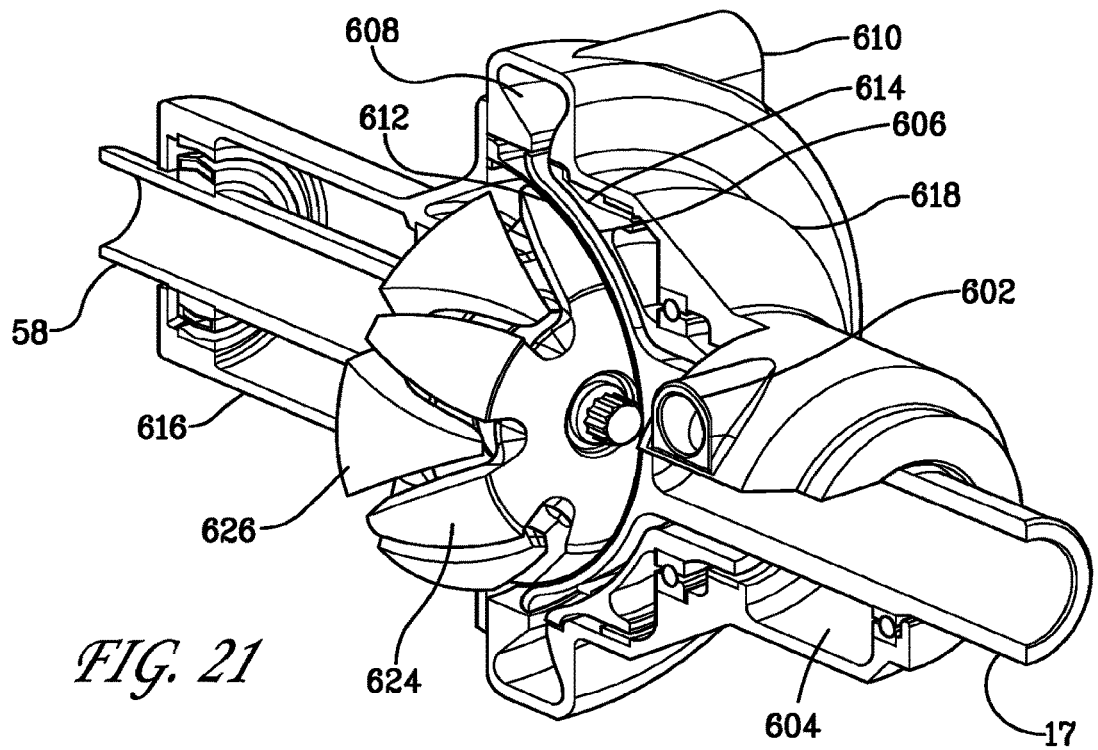
FIGS. 21 and 22 are isometric view of cross sections through the turbine coupling shown in FIG. 19.
Figure 22:
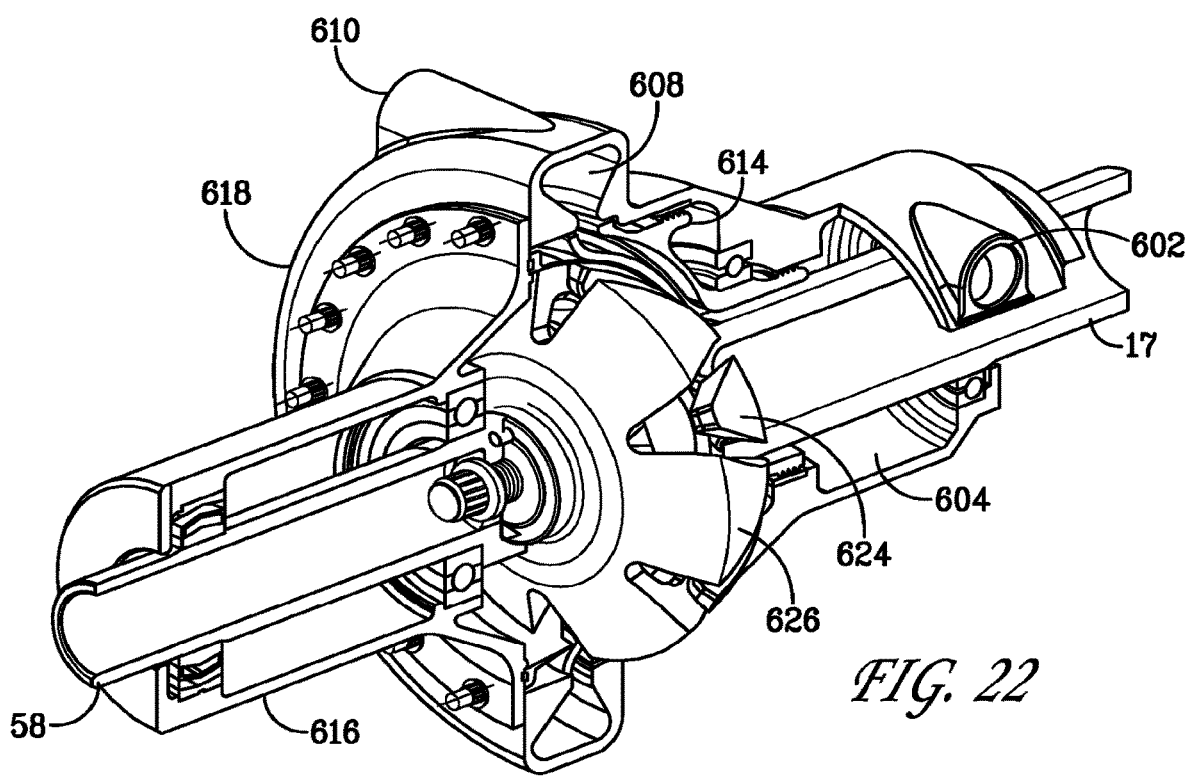
Figure 23:
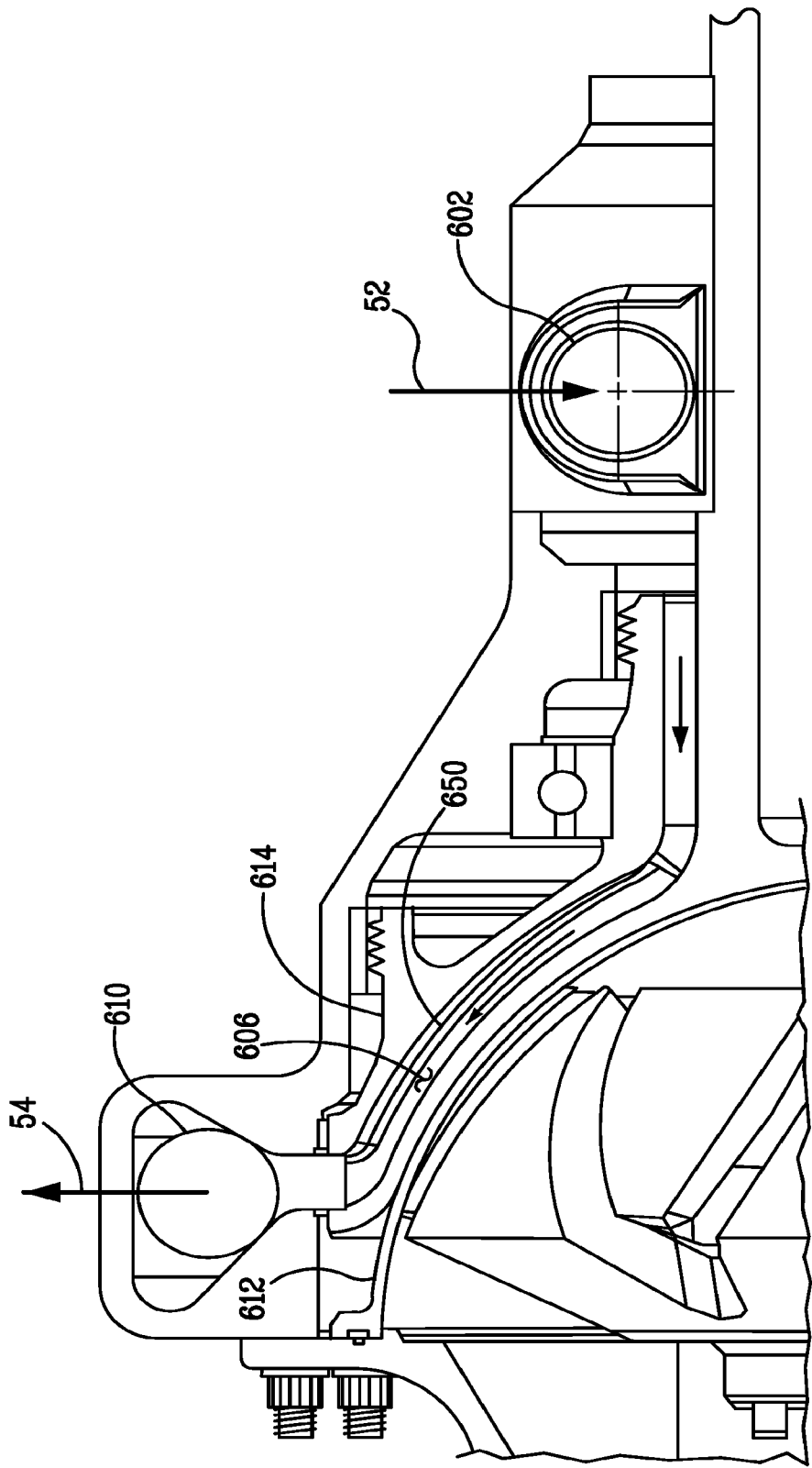
FIG. 23 is a cross section through a portion of the turbine coupling shown in FIG. 19.

As shown in FIG. 17, the speed of sound in SCO2 varies dramatically around the critical point. As a result, the temperature of SCO2 can also be determined by calculating the speed of sound in the fluid and cross-referencing the measured speed of sound to the temperature of SCO2 as a function of pressure and the speed of sound. Accordingly, another apparatus for measuring the temperature of the SCO2 directed to the inlet of the SCO2 compressor is shown in FIG. 18. A conduit 500 carries the stream 502 of SCO2 directed to the inlet of the SCO2 compressor. A pressure sensor, such as pressure sensor 404 shown in FIG. 16, is used to measure the pressure of the SCO2 in the conduit 500. Two transducers 504 and 506, such as piezoelectric transducers, are mounted on the conduit 500 opposing each other. Transducer 504 is a transmitting transducer and transducer 506 is a receiving transducer. According to the current invention, transducer 504 generates a sonic pulse 508 that is transmitted through the stream 502 of SCO2 and is received by transducer 506. By measuring the time lapse between the transmission of the sonic pulse 508 by transducer 504 and the reception of the pulse by transducer 506, and taking into account the distance between the transducers, the speed of sound of the SCO2 can be determined. In addition, an adjustment can be made to account for the velocity of the SCO2 through the conduit 500 by considering that the distance traversed by the sound wave is equal to the sum of the squares of the pipe diameter and the distance down the pipe the flow has to travel during the signal interval. In particular, the flow velocity can be determined by measuring the flow rate of the SCO2, for example using the flow meter 32 shown in FIG. 1, and dividing the measured flow rate by the inside diameter of the conduit. By cross referencing the measured pressure of the SCO2 and the calculated speed of sound with data for the speed of sound versus temperature at the measured pressure, such as that shown in FIG. 17, the temperature of the SCO2 can be accurately determined.

Regardless of the method used, preferably, the temperature of the SCO2 is measured within ½ m of the inlet of the compressor 20.

Although the temperature measuring methods have been described above in connection with a fossil fuel fired, dual cycle, supercritical fluid-air system for generating shaft power, it should be understood that the method is equally applicable to other supercritical fluid systems, such as an SCO2 system used in conjunction with a nuclear or solar heat source.

As previously discussed, a challenge to implementation of any SCO2 cycle arises because of the very high pressures required (e.g., over 7.0 MPa) in order to achieve a supercritical condition. Such high pressures in the SCO2 turbine makes sealing of the shaft extending from the turbine to the driven load difficult. As previously discussed, one approach is to incorporate the driven load into the SCO2 turbine pressure vessel. For example, the electric generator 90 in the FIG. 6 embodiment could be included within the SCO2 power turbine pressure vessel so that there is no need for extending a difficult to seal rotating shaft through the pressure vessel wall. However, as discussed above, such approach is not applicable to situations in which the driven load cannot be included within the SCO2 pressure vessel, such as a turboprop. Further, even when the approach is applicable, as in the case of electric generator, it has drawbacks.

According to one aspect of the current invention, a means is provided for transmitting shaft power across the SCO2 turbine pressure vessel boundary without the need for sealing a shaft that penetrates the pressure vessel. As shown in FIGS. 19-23, an eddy current torque coupling, or induction coupling, 36 is used to transmit power from the shaft 17, which is driven by the SCO2 power turbine 12", to the shaft 58 that, for example, drives an electric generator or turboprop. The shaft 17, which is the input shaft for the torque coupling 36, rotates within the SCO2 power turbine housing 618 supported on bearings 622. An induction rotor 614 is affixed to, and rotates with, the shaft 17. The induction rotor 614 is made from a magnetically permeable material, such as copper or aluminum.

A pressure membrane 612 attached to the housing 618 seals the SCO2 within the housing. In a preferred embodiment of the invention, the pressure membrane 612 has a spherical curvature with the high pressure of the SCO2 in the housing 618 existing on the outside of the spherical surface. This places the membrane 612 in compression, which allows for the use of materials that have substantially greater compressive than tensile strength, thereby allowing the membrane to made relatively thin. The thinness of the membrane 612 minimizes the gap between the armatures 624, 626 and the induction rotor 614, which allows for greater torque transmission. In a particular preferred embodiment of the invention, the pressure membrane 612 is made from a ceramic material such as, for example, silicon nitride, which has excellent compression strength.

The housing 618 has an inlet port 602 in flow communication with an inlet manifold 604 and an outlet port 610 in flow communication with an outlet manifold 608. Passages 606 connect the inlet and outlet manifolds 604 and 608.

The shaft 58, which is the output shaft of the torque coupling 36, rotates within an armature housing 616 supported by bearings 630 and 632. An armature assembly is coupled to the shaft 58. The armature assembly comprises a bolt 640 that supports a first armature 624 with south facing magnetic poles and a second armature 626 with north facing magnetic poles that are interleaved with the south facing poles of the first armature. The first and second armatures 624 and 626 are preferably made from any appropriate paramagnetic material, such as, for example, supermalloy. A permanent magnet 628, such as a neodymium magnet, is supported on the bolt 640 radially inboard of the armatures 624 and 626. The magnet 628 creates magnetic flux that extends between the alternating poles of the armatures 624 and 626.

Relative rotation between the permanent magnet 628, coupled to the output shaft 58, and the magnetically permeable material of the induction rotor 614, which is coupled to the input shaft 17, causes a rate of change of magnetic flux resulting in an eddy flow of current in the induction rotor. This current produces an opposing magnetic flux which opposes the change in magnetic flux and thereby serves to transmit torque across the pressure membrane 612 to the armatures 624 and 626. However, there is slippage between the two shafts such that the output shaft 58 rotates more slowly than the input shaft 17. The torque transmitted across the pressure membrane from the input shaft 17 to the output shaft 56 reaches a peak at a rotor speed difference of about 80-100 RPM.

Note that, alternatively, coils could be used instead of the inductor rotor solid material, in which case the stator and rotor would both rotate. The losses associated with slip could then be captured as electric current. This approach would require a brush system to transmit current to a non-rotating structure. In addition, by using coils and varying the resistance in the coil circuit, the torque transmitted could be varied, which could be useful for dynamic control.

The eddy current generated in the induction rotor 614 creates heat. As previously discussed in connection with the embodiment illustrated in FIG. 3, in one embodiment of the current invention, the valve 51 directs a portion 52 of the SCO2 compressor discharge 48 to the eddy current coupling 36 for cooling purposes. In particular, as shown in FIGS. 19-23, the stream 52 of cooling SCO2 is directed through the inlet port 602 in the housing 618 and flows through an annular manifold 604. From the manifold 604, the stream 52 of SCO2 flows through a series of passages 606 spaced circumferentially around the housing 618 that connect the inlet manifold 604 to the outlet manifold 608. A series of vanes 650 are distributed around the passages 606 to aid in the transfer of heat from the induction rotor 614 to the stream 52 of SCO2. As the stream 52 of cooling SCO2 flows through the passages 606 it absorbs heat, thereby cooling the induction rotor 614. After exiting the outlet manifold 608, the now heated stream 54 of cooling SCO2 exits the housing 618 via the outlet port 610. As shown in FIG. 3, the SCO2 stream 54 discharged from the eddy current torque coupling 36 flows through heat exchanger 10' in which it transfers heat to the SCO2 56 that will be expanded in the SCO2 power turbine 12'.

The valve 51 that controls amount of cooling SCO2 that is delivered to cool the eddy current coupling 36, shown in FIG. 3, may be controlled in real time using temperature probes measuring the temperature of the stream 53 of SCO2 exiting the heat exchanger 10" and temperature of the stream 54 of heated cooling SCO2 exiting the eddy current coupling 36 for control feedback. The objective is to create two streams of appropriate temperature such that when they are combined they have the proper "mixed" temperature to enable proper operation of the heat exchanger 10'.

Thus, according to one embodiment of the current invention, the heat generated by eddy current that must be removed from the eddy current coupling 36 is not lost from the system but is used to pre-heat a portion of the compressor discharge SCO2 that will be expanded in the SCO2 power turbine 12'. Although the power turbine 12' must be sized to account for the power loss in the eddy current coupling 36, such power loss results in the generation of heat that is fully recovered by the system.

Although the torque transmission method has been described above in connection with a fossil fuel fired, dual cycle, supercritical fluid-air system for generating shaft power, it should be understood that the method is equally applicable to other supercritical fluid systems, such as an SCO2 system used in conjunction with a nuclear or solar heat source.

Thus, although the current invention has been illustrated by reference to certain specific embodiments, those skilled in the art, armed with the foregoing disclosure, will appreciate that many variations could be employed. Therefore, it should be appreciated that the current invention may be embodied in other specific forms without departing from the spirit or essential attributes thereof and, accordingly, reference should be made to the appended claims, rather than to the foregoing specification, as indicating the scope of the invention.

What is claimed:

1. A system for determining a temperature of a supercritical fluid in a closed supercritical fluid cycle, the system comprising:
   a conduit in the closed supercritical fluid cycle, the conduit comprising an inside diameter for directing a flow of the supercritical fluid along an axial direction of the conduit;
   a supercritical fluid compressor, the supercritical fluid compressor including an inlet connected to the conduit so as to receive the supercritical fluid for compression therein;
   a pressure sensor, the pressure sensor mounted on the conduit and configured to measure a pressure value of the supercritical fluid in the conduit;
   a first transducer, the first transducer mounted on the conduit and configured to generate and transmit a sonic pulse in the supercritical fluid;
   a second transducer, the second transducer mounted on the conduit opposed to the first transducer and configured to receive the sonic pulse; and
   a controller, the controller in electronic communication with the pressure sensor, the first transducer, and the second transducer, wherein the controller is configured to determine a speed of sound value in the supercritical fluid based on the sonic pulse and to determine the temperature of the supercritical fluid based on the measured pressure value and the determined speed of sound value in the supercritical fluid directed to the inlet of the supercritical fluid compressor.

2. The system of claim 1, wherein the controller is further configured to:
   measure a time-lapse value between the transmission and reception of the sonic pulse; and
   to determine the speed of sound value in the supercritical fluid based on the measured time-lapse value and the inside diameter of the conduit.

3. The system of claim 1, further comprising a flow meter, the flow meter mounted on the conduit so as to measure a flow rate of the supercritical fluid in the conduit,
   wherein the controller is an electronic communication with the flow meter and the controller is further configured to:
   determine a flow velocity of the supercritical fluid based on the measured flow rate of the supercritical fluid and the inside diameter of the conduit; and
   adjust the speed of sound value based on the determined flow velocity of the supercritical fluid.

4. The system of claim 1, wherein the first and second transducers are mounted on the conduit within one half meter of the inlet of the supercritical fluid compressor.

5. The system of claim 1, wherein the supercritical fluid is supercritical carbon dioxide.

6. The system of claim 1, wherein the controller is configured to determine the temperature of the supercritical fluid based on a correlation between the temperature of the supercritical fluid and the speed of sound in the supercritical fluid at the measured pressure.

7. The system of claim 1, wherein at least a portion of the first transducer and at least a portion of the second transducer are in contact with the supercritical fluid flowing through the conduit.

* * * * *